US012657782B2

(12) United States Patent
Louie et al.

(10) Patent No.: US 12,657,782 B2
(45) **Date of Patent: *Jun. 16, 2026**

(54) SYSTEMS AND METHODS FOR AVOIDING SPATIAL OVERLAP WHILE RENDERING CONTENT SHARED BETWEEN ARTIFICIAL-REALITY DEVICES

(71) Applicant: Meta Platforms Technologies, LLC, Menlo Park, CA (US)

(72) Inventors: Alexander Michael Louie, Milpitas, CA (US); Michal Hlavac, Seattle, WA (US); Jasper Stevens, London (GB)

(73) Assignee: Meta Platforms Technologies, LLC, Menlo Park, CA (US)

( * ) Notice: Subject to any disclaimer, the term of this patent is extended or adjusted under 35 U.S.C. 154(b) by 167 days.

This patent is subject to a terminal disclaimer.

(21) Appl. No.: 18/587,638

(22) Filed: Feb. 26, 2024

(65) Prior Publication Data

US 2024/0202988 A1     Jun. 20, 2024

Related U.S. Application Data

(63) Continuation of application No. 17/528,992, filed on Nov. 17, 2021, now Pat. No. 11,941,725.

(51) Int. Cl.
G06V 40/18 (2022.01)
G06T 7/70 (2017.01)
(Continued)

(52) U.S. Cl.
CPC ............... G06T 11/00 (2013.01); G06T 7/70 (2017.01); G06T 13/80 (2013.01)

(58) Field of Classification Search
CPC ....................................................... G06T 11/60
(Continued)

(56) References Cited

U.S. PATENT DOCUMENTS

| 8,953,889 B1 | 2/2015 | Worley, III et al. |
| 9,721,386 B1 | 8/2017 | Worley, III et al. |
(Continued)

OTHER PUBLICATIONS

"Discover All of Acty's Functions in Detail," Acty [Online], 2020, 7 Pages, [Retrieved Feb. 12, 2021], Retrieved from the Internet: URL: https://www.acty.com/en/features.php.
(Continued)

*Primary Examiner* — Samantha (Yuehan) Wang
(74) *Attorney, Agent, or Firm* — Morgan, Lewis & Bockius LLP

(57) ABSTRACT

In one embodiment, a method includes, by an operating system of a first artificial-reality device, receiving a notification that virtual objects are shared with the first artificial-reality device by a second artificial-reality device, where the virtual objects are shared by being placed inside a sender-side shared space anchored to a physical object. The method further includes the first artificial-reality device accessing descriptors of a physical object and a spatial-relationship definition between the physical object and a receiver-side shared space, detecting physical objects based on the descriptors, determining pose of the receiver-side shared space, detecting physical constraints within the receiver-side shares space, receiving display instructions for the virtual objects, and rendering the virtual objects on the first artificial-reality device in the receiver-side shared space.

20 Claims, 12 Drawing Sheets

(51) Int. Cl.
    *G06T 11/00*     (2006.01)
    *G06T 13/80*     (2011.01)
(58) Field of Classification Search
    USPC ........................................................ 345/633
    See application file for complete search history.

(56) References Cited

U.S. PATENT DOCUMENTS

| | | | | |
|---|---|---|---|---|
| 11,941,725 | B2 * | 3/2024 | Louie ................... | G06T 19/006 |
| 2005/0275636 | A1 | 12/2005 | Dehlin et al. | |
| 2009/0254843 | A1 | 10/2009 | Van Wie et al. | |
| 2010/0241998 | A1 | 9/2010 | Latta et al. | |
| 2012/0013613 | A1 | 1/2012 | Vesely | |
| 2012/0086727 | A1 | 4/2012 | Korah et al. | |
| 2012/0194548 | A1 | 8/2012 | Ahn | |
| 2012/0249741 | A1 | 10/2012 | Maciocci et al. | |
| 2012/0256954 | A1 | 10/2012 | Soon-Shiong | |
| 2013/0178257 | A1 | 7/2013 | Langseth | |
| 2013/0265218 | A1 | 10/2013 | Moscarillo | |
| 2013/0316695 | A1 | 11/2013 | Park | |
| 2013/0343601 | A1 | 12/2013 | Jia et al. | |
| 2014/0091912 | A1 | 4/2014 | Lazarro et al. | |
| 2014/0270477 | A1 | 9/2014 | Coon | |
| 2014/0282282 | A1 | 9/2014 | Holz | |
| 2014/0327628 | A1 | 11/2014 | Tijssen et al. | |
| 2014/0333667 | A1 | 11/2014 | Jung et al. | |
| 2015/0040074 | A1 | 2/2015 | Hofmann et al. | |
| 2015/0146007 | A1 | 5/2015 | Dusik et al. | |
| 2015/0234477 | A1 * | 8/2015 | Abovitz .............. | G06F 3/04815 |
| | | | | 382/103 |
| 2016/0163063 | A1 | 6/2016 | Ashman | |
| 2016/0217760 | A1 | 7/2016 | Chu et al. | |
| 2017/0132841 | A1 | 5/2017 | Morrison | |
| 2017/0193693 | A1 | 7/2017 | Robert et al. | |
| 2017/0237789 | A1 * | 8/2017 | Harner ................ | H04L 65/4015 |
| | | | | 709/205 |
| 2017/0364234 | A1 | 12/2017 | Ligameri et al. | |
| 2018/0113598 | A1 | 4/2018 | Linder et al. | |
| 2018/0357824 | A1 * | 12/2018 | Wu ........................ | G06T 19/006 |
| 2019/0107990 | A1 | 4/2019 | Spivack et al. | |
| 2019/0192972 | A1 | 6/2019 | Garbut et al. | |
| 2019/0228143 | A1 | 7/2019 | Guyomarc'H et al. | |
| 2019/0260870 | A1 | 8/2019 | Spivack et al. | |
| 2019/0313059 | A1 | 10/2019 | Agarawala et al. | |
| 2019/0340816 | A1 | 11/2019 | Rogers | |
| 2020/0134780 | A1 | 4/2020 | Chapiro et al. | |
| 2020/0242813 | A1 * | 7/2020 | Nishikawa ............... | G08G 1/16 |
| 2021/0074068 | A1 | 3/2021 | Spivack et al. | |
| 2021/0090315 | A1 | 3/2021 | Gladkov et al. | |
| 2021/0291653 | A1 | 9/2021 | Higashiyama et al. | |
| 2021/0304506 | A1 | 9/2021 | Mourkogiannis et al. | |
| 2022/0076492 | A1 | 3/2022 | Smith et al. | |
| 2022/0078396 | A1 | 3/2022 | Gül et al. | |
| 2022/0090929 | A1 | 3/2022 | Shihoya et al. | |
| 2022/0198744 | A1 * | 6/2022 | Komoriya .............. | G06T 19/20 |
| 2023/0114080 | A1 * | 4/2023 | Yang ..................... | G06V 20/52 |
| | | | | 345/633 |
| 2025/0251781 | A1 | 8/2025 | Kim et al. | |

OTHER PUBLICATIONS

"Discover How Zappar Can Be Your Partner in Augmented Reality," Zappar Products and Services, Zappar [Online], 2020, 5 pages, [retrieved Feb. 12, 2021], Retrieved from the Internet: URL: https://www.zappar.com/product/.

Perez D., "Augmented Reality App Lets Users Scan and Share 3D Models," engineering.com [Online], Sep. 17, 2018, 4 pages, [Retrieved on Feb. 12, 2021], Retrieved from the Internet: URL: http://www.engineering.com/ARVR/ArticleID/17622/Augmented-Reality-App-Lets-Users-Scan-and-Share-3D-Models.aspx.

Ruth K., et al., "Secure Multi-User Content Sharing for Augmented Reality Applications," Proceedings of the 28th USENIX Security Symposium, Aug. 14-16, 2019, pp. 140-158, Retrieved from the Internet: URL: http://www.usenix.org/conference/unixsecurity19/presentation/ruth.

"Use Augmented Reality Remotely to Reduce Downtime and Interventions," Acty [Online], 2020, 7 pages, [Retrieved Feb. 12, 2021], Retrieved from the Internet: URL: www.acty.com/en/.

International Search Report and Written Opinion for International Application No. PCT/US2022/049916, mailed Mar. 14, 2023, 11 pages.

Huang S., et al., "A Smart-Decision System for Realtime Mobile AR Applications," 2019 IEEE Global Communications Conference (GLOBECOM), Dec. 9, 2019, 6 pages.

International Preliminary Report on Patentability for International Application No. PCT/US2022/049916, mailed May 30, 2024, 10 pages.

International Search Report and Written Opinion for International Application No. PCT/US2023/018200, mailed Jul. 12, 2023, 11 pages.

Jain P., et al., "Overlay Practical Mobile Augmented Reality," Proceedings of the 1st International Workshop on Extreme Heterogeneity Solutions, May 18, 2015, pp. 331-344.

Ran X., et al., "DeepDecision: A Mobile Deep Learning Framework for Edge Video Analytics," IEEE INFOCOM 2018—IEEE Conference on Computer Communications, Apr. 16, 2018, pp. 1421-1429.

Ran X., et al., "Delivering Deep Learning to Mobile Devices via Offloading", VR/AR Network 17: Proceedings of the Workshop on Virtual Reality and Augmented Reality Network, Aug. 11, 2017, pp. 42-47.

\* cited by examiner

012

010

011

800

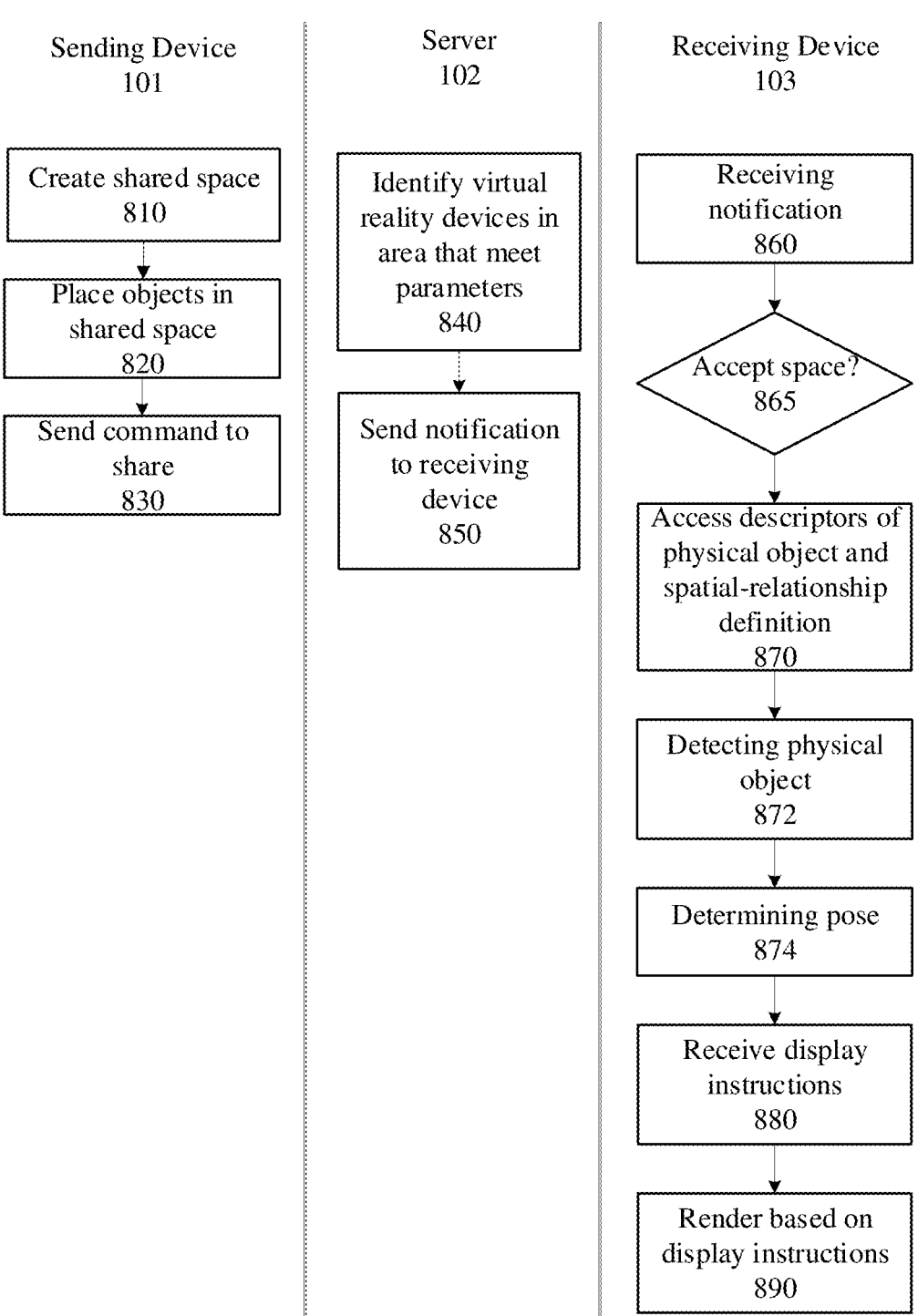

Sending Device
101

Create shared space
810

Place objects in
shared space
820

Send command to
share
830

Server
102

Identify virtual
reality devices in
area that meet
parameters
840

Send notification
to receiving
device
850

Receiving Device
103

Receiving
notification
860

Accept space?
865

Access descriptors of
physical object and
spatial-relationship
definition
870

Detecting physical
object
872

Determining pose
874

Receive display
instructions
880

Render based on
display instructions
890

SYSTEMS AND METHODS FOR AVOIDING SPATIAL OVERLAP WHILE RENDERING CONTENT SHARED BETWEEN ARTIFICIAL-REALITY DEVICES

CROSS REFERENCE TO RELATED APPLICATIONS

This application is a continuation U.S. patent application Ser. No. 17/528,992, titled "Systems and Methods for Content Sharing Between Artificial-Reality Devices," filed on Nov. 17, 2021 and which is herein incorporated by reference in its entirety.

TECHNICAL FIELD

This disclosure generally relates to artificial reality systems, and more specifically to sharing of virtual objects between two or more devices.

BACKGROUND

Artificial reality (AR) is a form of reality that has been adjusted in some manner before presentation to a user, which may include, e.g., a virtual reality, an augmented reality, a mixed reality, a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Artificial-reality devices allow users to interact with virtual environments and objects in a way that increasingly represents human interactions with physical environments and objects. A user wearing or otherwise using an artificial-reality device may be able to see both virtual and physical objects simultaneously, making the virtual objects blend with a user's physical environment. One major difference between virtual objects and physical objects is that the virtual objects can only be seen by one using an artificial-reality device, making it more inherently well-suited for personal experiences than social ones.

SUMMARY OF PARTICULAR EMBODIMENTS

The present disclosure describes a method which makes the using of artificial-reality devices more suitable for social interactions. One major distinction between interactions in an artificial reality environment and those in a physical environment is the ability of two users of artificial-reality devices to share virtual objects with each other. However, this sharing can often be awkward. In traditional method of sharing virtual objects between two users, a first user must open an application, move a virtual object into the application, and send the virtual object to a second user. In response to receiving some sort of notification from the first user, either directly or indirectly, the second user must then open the application on their own device to see the object. The disclosed method makes this process of sharing virtual objects between two devices intuitive and frictionless. It is intuitive in that the virtual objects are shared like physical objects. It is frictionless in that an operating system (OS) encapsulates content/objects from various applications, which allows for the first user to share an object with the second user without either user having to open an application.

This sharing may be done even remotely, by linking a sender-side shared space and a receiver-side shared space to each other, which shared spaces may have different dimensions and/or have different physical obstacles within them. Additionally or in the alternative, this sharing may be done by creating a shared space for depositing and viewing virtual objects. This allows users of artificial-reality devices to share the same space even when they are not in the same room at the same time. A user who shares a virtual object may deliver or leave an item at one time and a user who receives the virtual object may receive or find the item at another time. For example, one user may leave an item on a shared space defined by the surface area of a table; when a server device determines that a second user is within a certain proximity of the table, the second user may receive a notification that a shared space is available for viewing and, after accepting an invitation to view, essentially be able to see the item left on the table. In some embodiments, users may define a sender-side shared space and receiver-side shared space, which may be a single shared space. One or more virtual objects may already exist within or be dragged into the defined sender-side shared space. Subject to security and share settings on the sending device, the virtual objects may be sent to another user's device, which may display the virtual objects in the receiver's defined receiving space subject to the receiving user's security and share settings.

Sharing of virtual objects between devices may be done natively through an operating system rather than requiring the two users to enter the same or similar applications to share the virtual objects. One roadblock to seamless sharing of digital objects using traditional method is the need to run specific applications on both the sending and receiving devices. In an embodiment, an operating system may be configured to provide a central platform that manages sharing between users of different devices. This operating system may serve as a host for storing and encapsulating any content from any application in a virtual object or an augment. The operating system may facilitate inter-application and inter-user sharing of the encapsulated content, thereby eliminating the need to rely on the third-party applications for such tasks. This provides a distinct advantage over current virtual sharing practices which are managed by individual applications, which introduces a lot of friction when sharing content across applications and/or users.

The disclosed method provides a natural way of sharing virtual objects by integrating the virtual world with the physical one. In an embodiment, shared spaces may be created, where virtual objects and content may be shared in or through a space or spaces that are tied to a physical environment. Unlike a virtual whiteboard, the shared surfaces could be asymmetrical. While two users may be able to see the same content, the content may be rendered differently, in a way that conforms to each individual's personal space. For example, a virtual toy programmed to run around a surface of a desk may be placed on a sender's desk but be able to run around the surface of the receiver's desk while conforming to the receiver's desk's dimensions and other physical objects placed on top of it. This virtual content that is shared may be shared via shared surfaces by sharing instructions, which may be independently rendered/displayed to the user based on the physical context of the viewing user. In another example, a picture sent to a receiving device which was placed in the center of a sender-side shared space may be rendered closer to the edge of the receiver-side shared space to accommodate physical pictures which occupy the center of the receiver-side space.

In particular embodiments where sharing occurs between co-located devices, a first artificial-reality device may receive a notification that a shared space generated by a second artificial-reality device is shared with the first artificial-reality device, the shared space being anchored to a physical object in a real-world environment; receive one or more virtual object placed inside the shared space by a user of the second artificial-reality device; receive descriptors of the physical object and a spatial-relationship definition between the physical object and the shared space; detect the physical object in the real-world environment based on the descriptors of the physical object; determine a pose of the shared space based on the detected physical object and the spatial-relationship definition between the physical object and the shared space; and render the one or more virtual objects based on the pose of the shared space and a viewpoint of the first artificial-reality device.

In particular embodiments where sharing occurs between remotely-located devices, a first artificial-reality device may receive a notification from a server that one or more virtual objects are shared with the first artificial-reality device by a second artificial-reality device, wherein the one or more virtual objects are shared based on being placed by a user of the second artificial-reality device inside a sender-side shared space anchored to a sender-side physical object; access descriptors of a receiver-side physical object and a spatial-relationship definition between the receiver-side physical object and a receiver-side shared space; detect the receiver-side physical object based on the descriptors of the receiver-side physical object; determine a pose of the receiver-side shared space based on the detected receiver-side physical object and the spatial-relationship definition; detect physical constraints within the receiver-side shared space; receive display instructions for the one or more virtual objects; and render the one or more virtual objects within the receiver-side shared space based on the display instructions and the physical constraints.

In particular embodiments, the first artificial-reality device may access, before the notification is received by the first artificial-reality device, mapped location data of an environment surrounding the first artificial-reality device; use the mapped location data to generate a recommendation for the receiver-side shared space; and store, based on the recommendation for the receiver-side shared space, the descriptors of the receiver-side physical object and the spatial-relationship definition between the receiver-side physical object and the receiver-side shared space.

In particular embodiments, the mapped location data comprise information about physical objects in the environment and placement of virtual objects in the environment.

In particular embodiments, at least one of the sender-side shared space and the receiver-side shared space is a planar surface and the one or more virtual objects are rendered on top of the planar surface.

In particular embodiments, the receiver-side shared space has different dimensions than the sender-side shared space.

In particular embodiments, the second artificial-reality device sending the one or more virtual objects at a different time than the first artificial-reality device receives the one or more virtual objects.

In particular embodiments, the second artificial-reality device is one of a plurality of artificial-reality devices that share virtual objects with the first artificial-reality device, wherein the receiver-side shared space is configured to display the virtual objects shared by the plurality of artificial-reality devices.

In particular embodiments, the sender-side shared space is configured to automatically transmit virtual objects placed within the sender-side shared space to the first artificial-reality device and displayed on the receiver-side shared space.

In particular embodiments, the one or more virtual objects are confined within the receiver-side shared space.

In particular embodiments, the second artificial-reality device may, after rendering the one or more virtual objects within the receiver-side shared space, animate the one or more virtual objects to have the one or more virtual objects move out of the received-side shared space and into an environment surrounding the received-side shared space.

In particular embodiments, a placement of the one or more virtual objects relative to the sender-side shared space differs from a placement of the one or more virtual objects relative to the receiver-side shared space.

In particular embodiments, the second artificial-reality device may render a second virtual object encapsulating content from an application running on the operating system of the first artificial-reality device; detect, based on hand-tracking data, that a user of the first artificial-reality device moved the second virtual object into the receiver-side shared space; and in response to detecting that the user of the first artificial-reality device moved the second virtual object into the receiver-side shared space, share the second virtual object with the second artificial-reality device by causing the second artificial-reality device to render the second virtual object within the sender-side shared space.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 8 illustrates an example method for sharing of virtual objects in a single shared space.

DESCRIPTION OF EXAMPLE EMBODIMENTS

Figure 1:
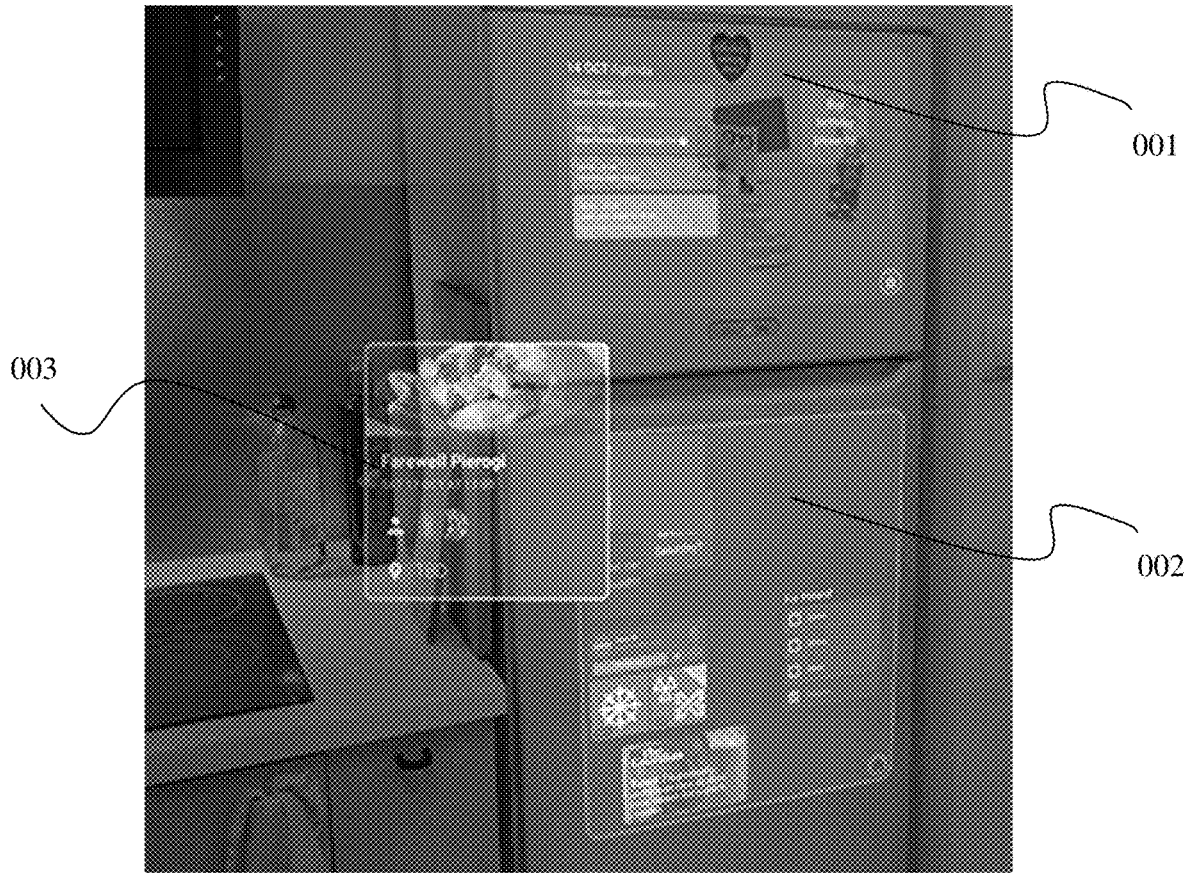
FIG. 1 illustrates an example of co-located sharing of a shared space.

The disclosed invention describes various methods of sharing virtual objects between different artificial-reality devices, often used by different users. In some embodiments, the method involves creating a shared space, or linked shared spaces, where virtual objects may be sent and received. In particular embodiments, a shared space may be a location, 2D plane, or 3D volume that is anchored to some physical object in the user's environment (e.g., a shared space may have an location and orientation that is defined relative to a physical object like a refrigerator door, table top, or wall). The location and/or boundary of the shared space or these shared spaces may be created based on instructions received by the artificial-reality devices. For example, the shared space may be drawn by a user of the device (e.g., the user may use hand gestures or a controller to draw a 2D or 3D space that is anchored to some physical object). As another example, the shared space may be automatically generated based on usage patterns and/or placement of virtual and/or physical objects, which may be detected and tracked using sensors and/or maps associated with the artificial-reality device. In some embodiments, the artificial-reality device may recommend a space and ask the user for confirmation. The recommendation may be generated by a computer program in accordance with one or more rules. For example, the computer program may detect that the user often places virtual objects in a certain region in physical space, which may make the region a reasonable candidate for a shared space. The computer program may then determine that the physical space corresponds to a table top, wall, or a physical space that was previously defined as a shared space by another user. The computer program may use the characteristics of the physical space or the previously defined shared space to determine a location, orientation, and/or dimension for a recommended shared space for the user. A virtual representation of the recommended shared space may be rendered and displayed to the user. Upon receiving confirmation from the user that the recommended shared space is agreeable, the computer program may persist the characteristics of the shared space in storage, including its dimension, pose, and/or relative placement to a physical object.

The present disclosure contemplates a shared space for co-located users and two or more linked shared spaces of remote users. For example, one shared space may be linked to another shared space to allow for the sending of virtual objects between two or more devices. Sharing between devices may be synchronous (e.g., users would see the same shared content at the same time) or asynchronous (e.g., users would see the shared content at different times). In addition, the shared content may be symmetric (e.g., remote users are shown the same shared content) or asymmetric (e.g., remote users are shown different versions or representations of the shared content). In some embodiments, the shared space defined by the sending artificial-reality device may have different dimensions than the shared space defined by the receiving artificial-reality device, further contributing to the natural feeling of sharing that imitates sharing physical objects in the physical world.

FIG. 1 illustrates an example of co-located sharing of a shared space. In this example, a shared space 001 is anchored to the door of a refrigerator. Users of artificial-reality devices that are authorized to share virtual objects within the shared space may effectively leave virtual objects in that space 001. Users of artificial-reality devices that are authorized to view virtual objects within the shared space 001 may see the virtual objects which have been left within the shared space 001. In some embodiments, this sharing and viewing is nearly instantaneous. In some embodiments, users may be authorized both to share and view objects within the shared space 001. For example, users of artificial-reality devices who are part of the same household may be able to share and see items in the same way we might traditionally use a whiteboard or magnets to leave messages for other members of the household. For example, through an AR device, User A may see the shared space 001 and add a note in it. When User B enters the kitchen, its AR device may detect the refrigerator, determine that the shared space 001 anchored to it is shared with User B, and render a virtual representation of the shared space 001 along with the content shared through it. If both User A and User B are co-located and can both see the shared space 001, they may see the same exact content. In particular embodiments, particular content within the shared space 001 may be shared with different people. For example, if a particular content within the shared space 001 is shared with User A but not with User B, only User A would be able to see the content even though the space 001 itself might be visible to both users.

In particular embodiments, a user may define a private space that is only accessible to that user. FIG. 1 shows an example of a private space 002 that is anchored to a refrigerator. If the private space 002 belongs to User A and the shared space 001 is shared with User A, the AR device of User A would render both the private space 002 and the shared space 001 to User A, similar to what is shown in FIG. 1. Since the private space 002 is not shared with User B, the AR device of User B would only render the shared space 001 and not the private space 002 of User A.

In particular embodiments, content may be dragged and dropped into or out of the shared space 001. FIG. 1 shows a piece of content 003 being dragged into or out of the shared space 001. While being dragged, the content 003 may be dislodged from the physical object to which it was anchored (e.g., the refrigerator) and follow the user's gesture or cursor. While in transit, the content 003 may be rendered with a frontal-view facing the user. When the user drops the content 003 into the shared space 001, it would be associated with the shared space and be rendered accordingly (e.g., it would be oriented based on the dimension and/or orientation of the shared space 001). The content 003 would then be shared with any user that has permission to view it.

Figure 2:
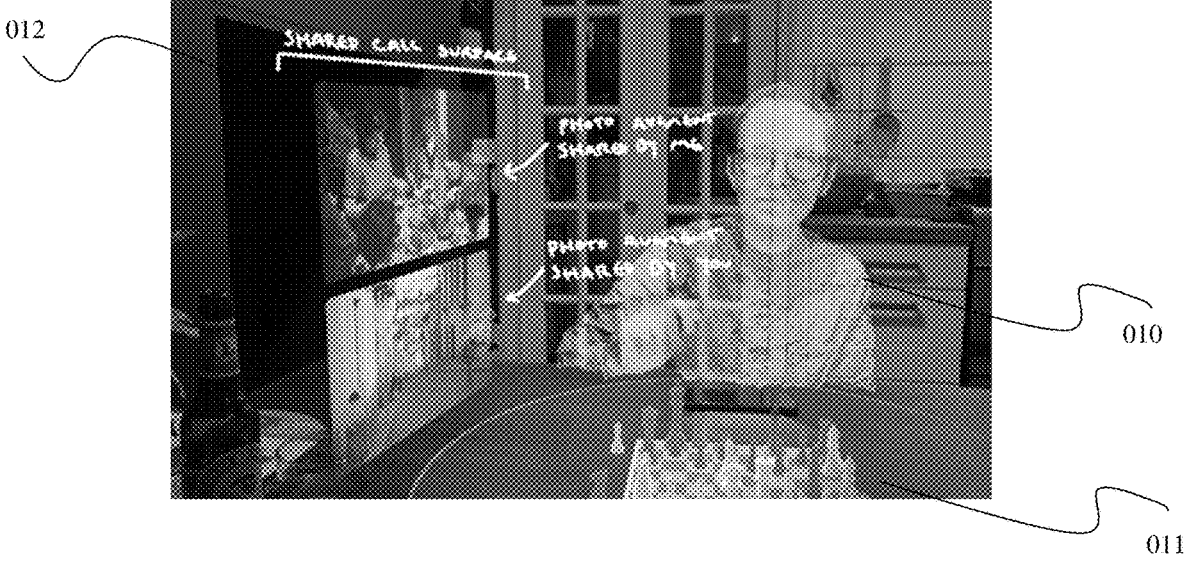
FIG. 2 illustrates an example of remote sharing of a shared space.

FIG. 2 illustrates an example of remote sharing of a shared space between remote users. In this example, the view from the perspective of a local user (not shown) of a device authorized both to send and receive virtual objects is shown. The user in this example is interacting with a remote user 010 via a virtual call. In effect, this simulates two users being in the same room. When the remote sharing is done synchronously, the shared social aspect of this method may be maximized. The user may define a shared space 011 on his kitchen table. The shared space 011 may be linked to another shared space of the other user 010. The shared space of the other user 010 may be place anywhere, such as on a picnic table at a park. The shared space 011 may be used by the users to synchronously share content. For example, two users may be able to play a game of chess together and see the same virtual chessboard and moving chess pieces within the shared space 011. FIG. 2 also shows the user having a vertical shared space 012, which may be anchored to the user's table or wall. Simultaneously, each user may also be able to view personal content through their own artificial-reality device which is inside of the shared space 012. For example, the top photo in the shared space 012 may be shared by the local user with the remote user 010, and the bottom photo may be shared by the remote user 010 with the local user.

Figure 3:
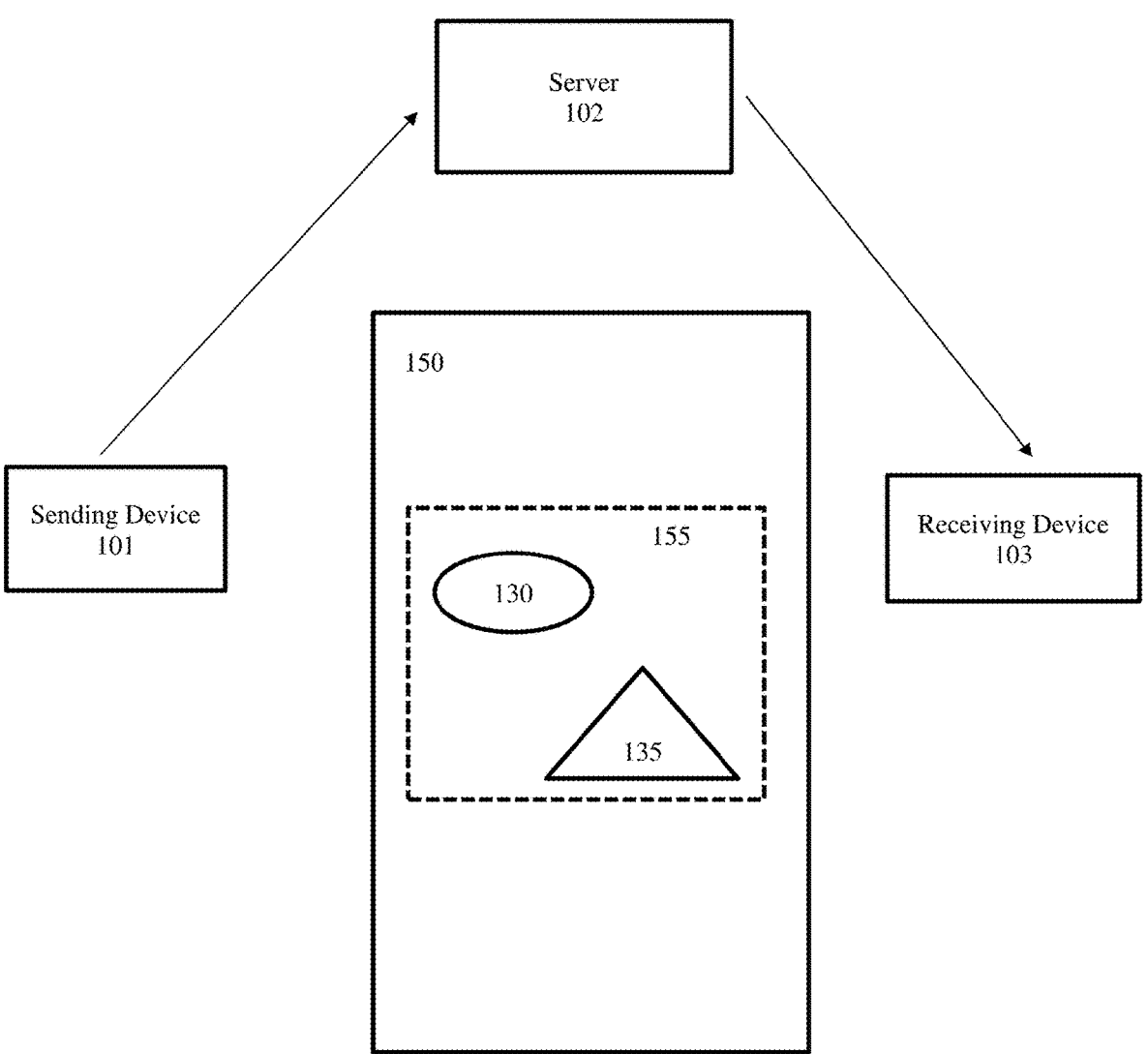
FIG. 3 illustrates an example of co-located sharing of a shared space.

FIG. 3 illustrates an example of co-located sharing of a shared space, or the sharing of items in a shared space between two co-located devices, sending device 101 and receiving device 103. A shared space 155 may be defined by a sending device 101 or a receiving device 103 as further described elsewhere in this disclosure. The shared space 155 may be located on or anchored to a physical object 150, such as a refrigerator or a desk. One or more virtual objects 130, 135 may be placed in the shared space by a user of the sending device 101 to be shared with users of other devices. These users may be identified as anyone who has a compatible device, anyone who falls within a certain category such as friends, or a specific individual identified by the user of the sending device 101. In some embodiments, the sending device 101 and the receiving device 103 communicate through a server 102. In other embodiments, the sending device 101 and the receiving device 103 may communicate directly with each other. After the sending device 101 signals that virtual objects 130, 135 are to be shared, either individually or by nature of their being placed in the shared space 155, the receiving device 103 receives a notification that virtual objects 130, 135 are available for viewing in the shared space 155. If the user of the receiving device 103 selects an option to view the shared space 155 the virtual objects 130, 135 in the shared space 155 will be displayed by the receiving device 103. The notification may be a question presented on the receiving device 103 after the sending device 101 has placed the virtual objects 130, 135 in the shared space 155. In some embodiments, the notification may simply be the presentation of the virtual objects 130, 135 in the shared space 155 if the user of the receiving device 103 has previously granted permission to see whatever is placed in the shared space 155. This permission may be granted to specific individuals, identified groups, or the general public.

Figure 4:
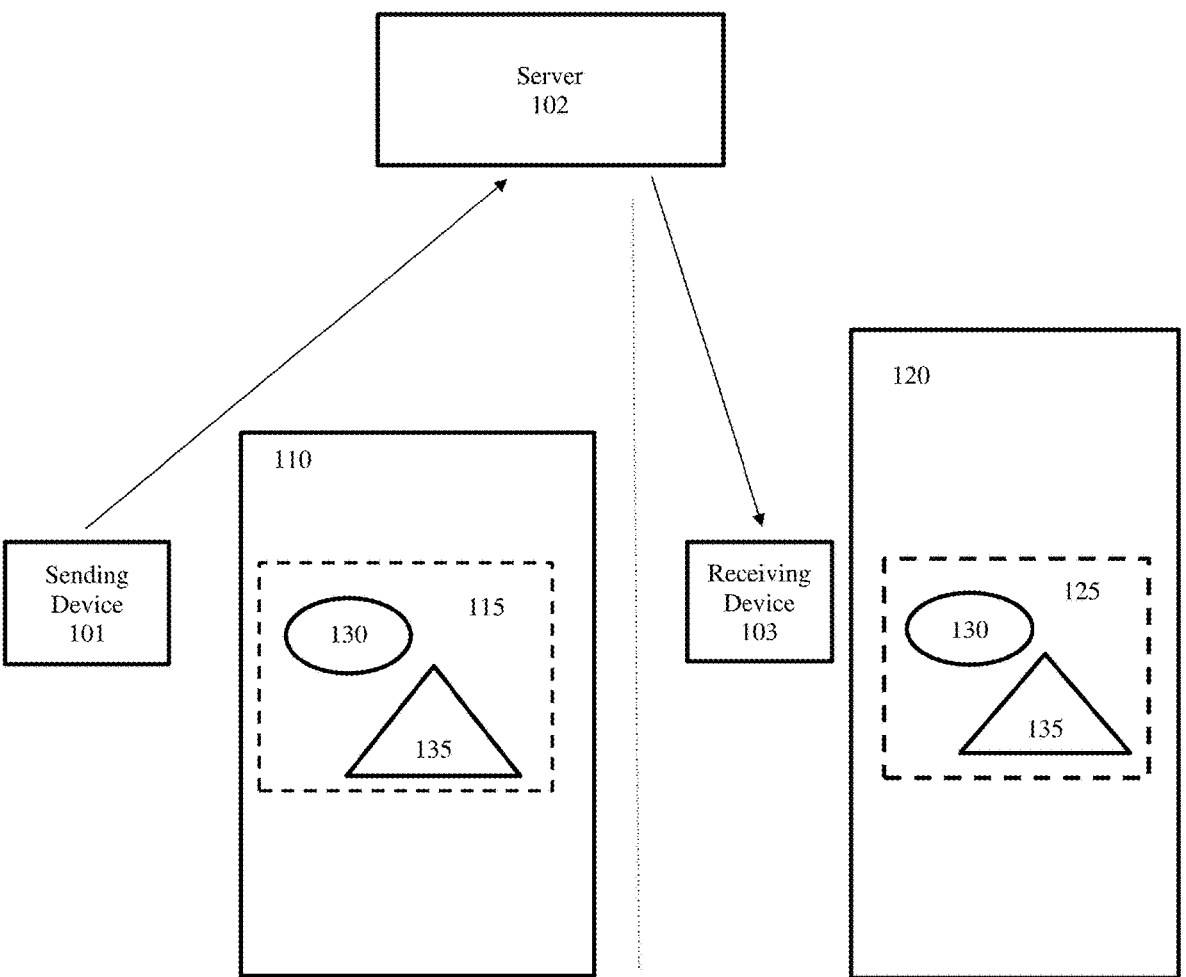
FIG. 4 illustrates an example of remote sharing of a shared space where the sender-side shared space and receiver-side shared space are symmetric.

FIG. 4 illustrates an example of remote sharing of a shared space where the sender-side shared space and receiving side shared space are symmetric. As illustrated, the shared virtual objects 130 and 135 shown to both users appear the same. Unlike when two devices are co-located, the sending device 101 and receiving device 103 would each define a shared space 115, 125 on different physical objects 110, 120. After the sender-side shared space 115 is defined, a user of the sending device 101 may place virtual objects 130, 135 in the sender-side shared space 115. Before or after signaling that the virtual objects 130, 135 will be shared, a receiving device 103 may define a receiver-side shared space 125. In some embodiments, the receiving device 103 may have previously defined the receiver-side shared space 125 and granted permission to display virtual objects 130, 135 sent by a defined group of sending devices. The defined group of sending devices may be a specific individual or individuals, an identified group or groups, or the general public. In other embodiments, the receiving device 103 presents a notification to the user of the receiving device 103 informing the user that virtual objects 130, 135 are available to be displayed in the receiver-side shared space 125. If permission is given to display the virtual objects 130, 135, the virtual objects 130, 135 will be displayed in the receiver-side shared space 125 by the receiving device 103.

Figure 5:
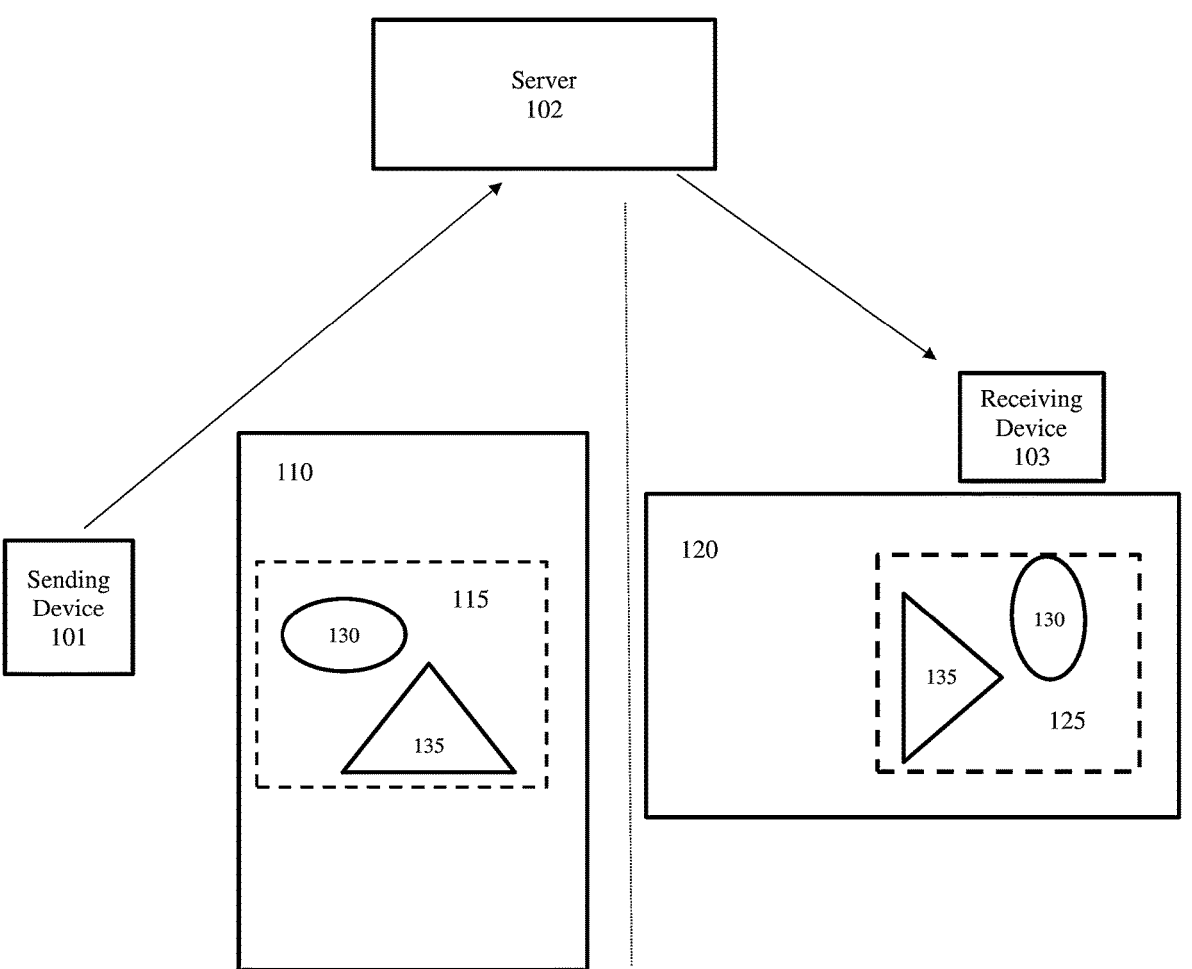
FIG. 5 illustrates an example of remote sharing of a shared space where the sender-side shared space and receiver-side shared space are oriented according to the location of the respective users.

FIG. 5 illustrates an example of remote sharing of a shared space where the sending side-shared space and receiver-side shared space are positioned and oriented differently. For example, the position and orientation of the sender-side shared space 115 as defined by the user of the sending device 101 may be different from those of the receiver-side shared space 125 defined by the user of the receiving device 103. For example, the shared space 115 may be anchored to a vertical physical object 110 (e.g., a wall or refrigerator), and the shared space 125 may be anchored to a horizontal physical object 120 (e.g., a table). The presentation of the shared virtual objects 130, 135 within the receiver-side shared space 125 is not symmetrical to those in the sender-side shared space 115 like in FIG. 4. Instead, the virtual objects 130, 135 are rearranged automatically to present a similar picture to the user of the receiving device 103 as the one seen by the user of the sending device 101.

Figure 6:
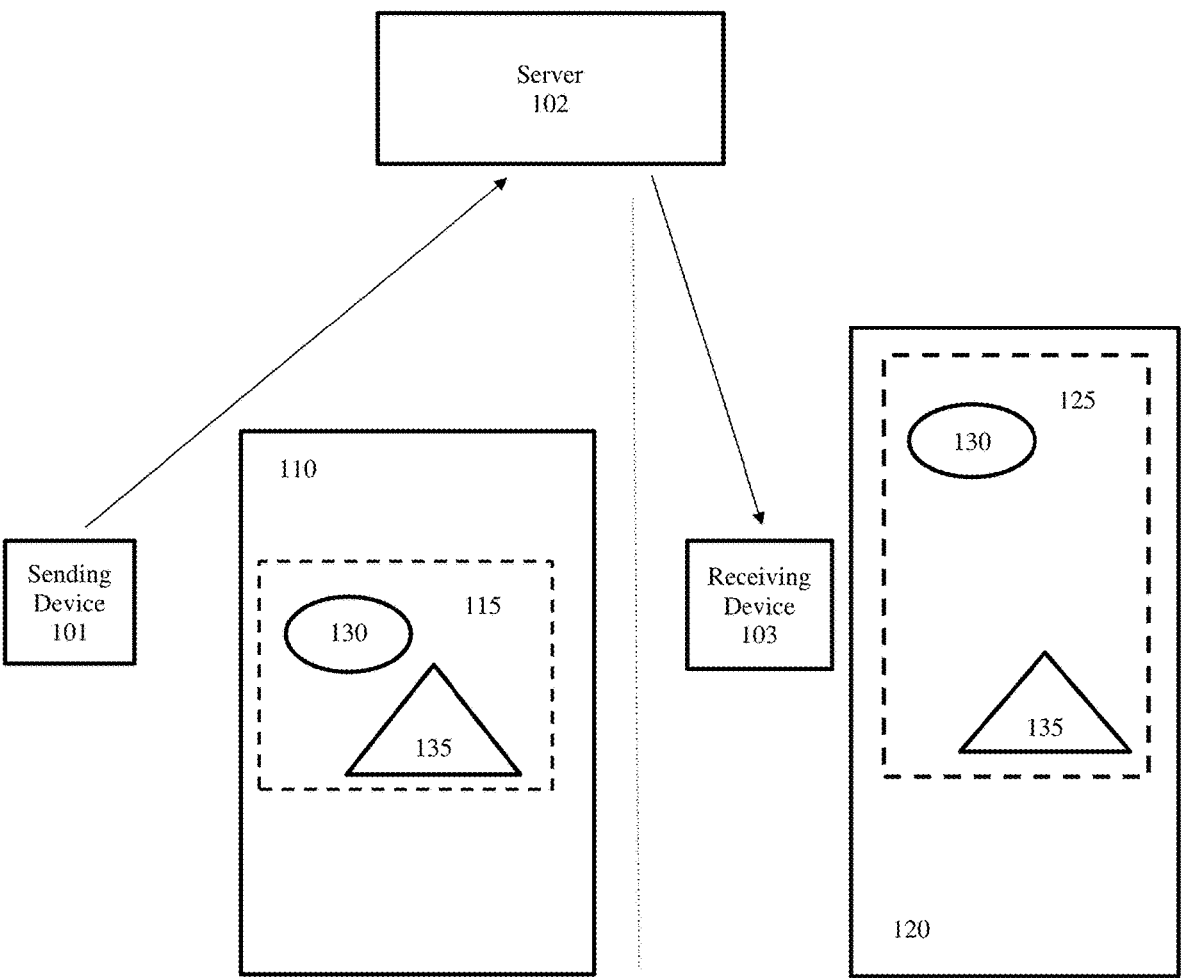
FIG. 6 illustrates an example of remote sharing of a shared space where the sender-side shared space and receiver-side shared space have customized dimensions and object layouts.

FIG. 6 illustrates an example of remote sharing of a shared space where the sender-side shared space 115 and receiver-side shared space 125 are different dimensions. When the sender-side shared space 115 and receiver-side shared space 125 are different dimensions, a user of the receiving device 103 may wish to see the virtual objects 130, 135 presented within the same dimensions, thus only filing a portion of the receiver-side shared space 125. For example, a user of a receiving device 103 who is playing virtual chess with a user of a sending device 101 may wish for the virtual object (e.g., the chess board) to look symmetrical to what the user of the sending device 101 sees. Alternatively, the user of the receiving device 103 may wish to either maximize the greater dimensions of their shared space or adjust the spacing of the virtual objects to fit within the tighter dimensions of their shared space. For example, a user of a receiving device 103 may wish to see pictures in a size that is proportional to the size of the receiver-side shared space 125, or they may wish to receive messages in a corner of their shared space. In particular embodiments, the device may automatically determine how to distribute the virtual objects 130, 135 within the available shared space 125.

Figure 7:
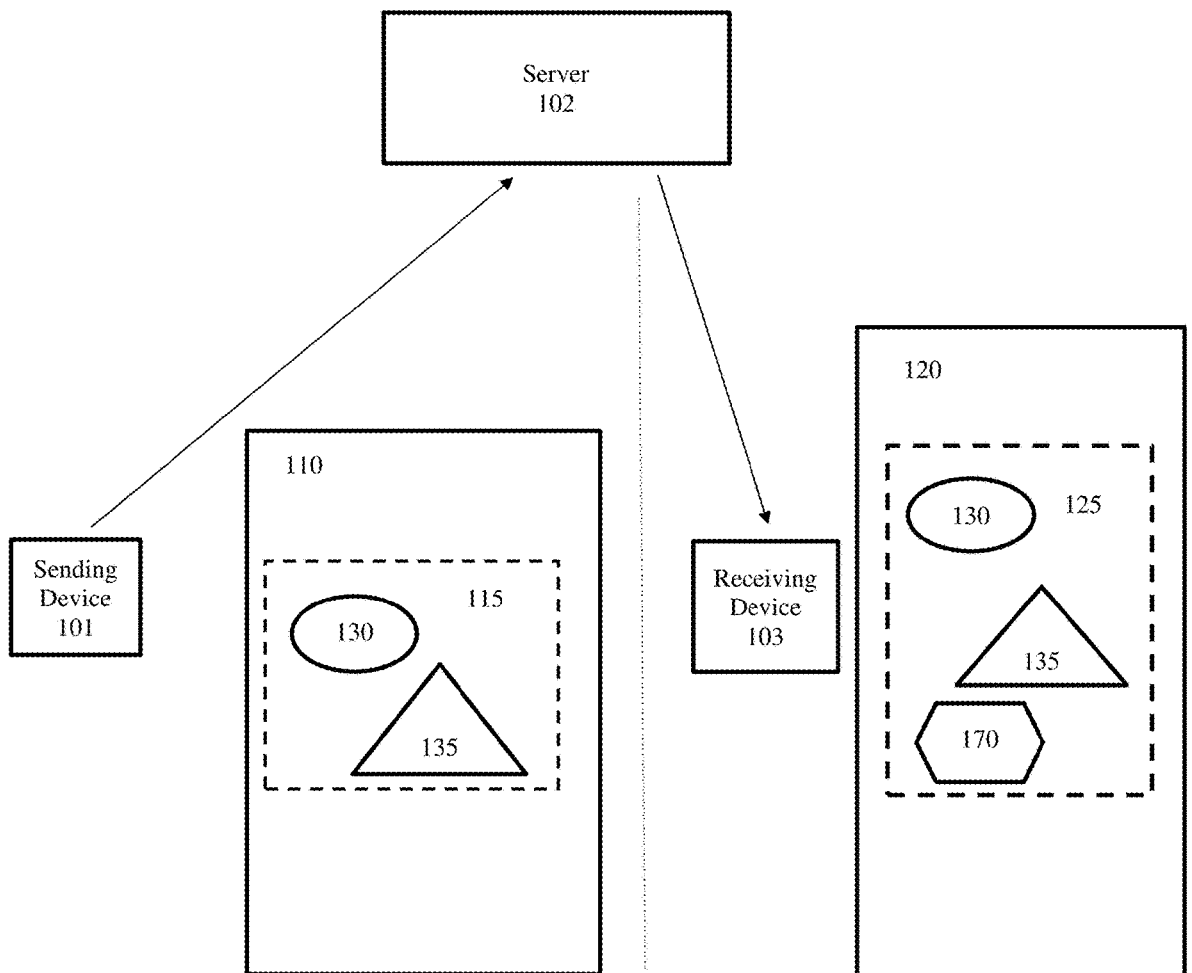
FIG. 7 illustrates and example of remote sharing of a shared space where physical obstacles located within the receiver-side shared space influences the layout of the virtual objects.

FIG. 7 illustrates an example of remote sharing where different physical constraints are present within the shared spaces. Like in FIG. 6, the user of the receiving device 103 has the option of viewing the shared virtual objects 130, 135 in a way that is individualized to their shared space. This may include avoiding one or more physical obstacles 170 or wrapping around physical objects. For example, virtual objects 130, 135 may be pictures and may be sent by being placed in the center of a sender-side shared space 115, but a receiving device 103 may render the pictures (virtual objects 130, 135) toward one side of the receiver-side shared space 125 to account for a physical notepad (physical obstacle 170) that is currently on the desk (physical object 120) which serves as the anchor for the receiver-side shared space 125. As another example, a message may wrap around a mug, which may alternatively be defined as a shared space itself. The receiving device 103 may use sensors to detect physical obstacles 170 (e.g., the notepad) that are within the shared space 125 and reposition the virtual objects (e.g., 130, 135) to avoid colliding with the physical obstacles 170.

One way the present disclosure creates a more intuitive method of sharing is through its flexibility in what may be defined as a shared space. In an embodiment, a defined shared space may be planar, or a three-dimensional volume. It may be an arbitrary volume. The defined space may represent the complete physical surface such as a wall, a refrigerator, or a table. The defined space may instead represent a portion of a physical surface, combined surfaces, or even a feature such as a fireplace or a whole room. The defined space can extend much beyond a traditional surface, to include a mesh created around a physical object that can act as a surface, such as a mug. These shared spaces are anchored to physical objects in a flexible way.

The disclosed method allows for users to control what is shared. In an embodiment, an artificial-reality device receives input designating certain virtual objects as objects to be shared. This may be done by individually labeling the objects as objects to be shared, which may be done before dragging them into a designated shared space or while also creating a shared space around the objects to be shared. This may also be done, according to permissions and privacy settings, by simply dragging a virtual object into a sharing space. This dragging may be done by the device tracking eye and/or hand movements of a user of the device.

In some embodiments, the sending device identifies virtual objects which are only visible to the user of the sending device and presents a recommendation to the user of the sending device to include one or more of the virtual objects in a group of objects to be shared with one or more other devices. The user may indicate a selection through means of voice commands, eye movement, hand motions, or any other means of providing input to the device.

Another way the disclosed method creates a more natural way of sharing is by creating the shared space around the objects themselves. In an embodiment, virtual objects may be placed around an area before input indicates to an artificial-reality device that a region, bounded by the virtual objects, will be shared with other devices. The region becomes a sharing space. When the space is defined by the virtual objects, the device may execute instructions to define the space slightly outside the exact bounds drawn by the selected virtual objects. After receiving input to share the space with other devices, the sending device sends instructions to a server which sends those instructions to one or more receiving devices, depending on specific criteria such as proximity to an area or access permissions of receiving devices. When the receiving devices receive the instructions, the receiving devices execute the instructions. A receiving device may first present a user interface to a user of the receiving device or some other notification and input mechanism to ask the user if the user wants the content to be displayed on their device. If the shared space is co-located, such that the sending and receiving devices are presenting visuals in the same physical space, the receiving device may ask if the user wants to see the objects within the space. Alternatively, if the user has set the device to display images, for example, in the space or from a specific sender, the receiving device may automatically display the virtual objects by executing the instructions sent by the sending device.

In some embodiments, the shared space for the sending and receiving devices are different. For example, the receiving device may have already defined a receiver-side shared space for virtual objects sent by a designated group of other devices. This receiver-side shared space may be linked to one or more sender-side shared spaces so that virtual objects placed within any of the spaces would be shared with the other linked spaces. The shared space of each user may be controlled by settings that determine which devices to connect with, requirements for notification, and limits on what may be shared.

In some embodiments, when remote sharing occurs, the receiving device may not have defined a receiving space for virtual objects before receiving a notification that another device has shared contents of a space with the receiving device. In some embodiments, the receiving device uses environmental and location input, both saved and real-time, to determine potential areas to be used as a receiving space. For example, the receiving device may determine that a physical item in a room is a table and further that the table would be a good location for a receiving space. Additionally or in the alternative, a user of the receiving device may select or draw an arbitrary space for receiving virtual objects. Additionally or in the alternative, the receiving device may select a space for displaying the shared content based on the user's usage patterns. For example, if the user has placed several virtual objects on a wall, the receiving device may designate the space on the wall to be where shared content would appear. The arbitrary space may be planar or a three-dimensional volume.

In some embodiments, a user of an artificial-reality device may label a defined space for sending and/or receiving virtual objects. For example, the user may label her desk as "Y's shared space" or a space defined on a refrigerator door as "fridge." The artificial-reality device may be any device that can be programmed to display virtual objects to a user, such as a phone, a tablet, or a specialized device with a headset. The user may define the space by, for example, using his hands to draw a box/surface in space to define the shared space. Additionally or alternatively, the user may be presented with a recommendation and the user may simply accept it and/or tweak it before accepting it. The system may generate the recommendation to present to the user by identifying objects and other details in a physical environment that can be used with algorithms programmed into the system to determine areas most likely to be selected as a shared space. Another way a user may select a shared space involves the system using sensors and algorithms to determine the boundaries of a natural physical surface, such as a table, and the user selecting the identified surface. In some embodiments, the device may already have a map of a room, allowing it to better suggest a sharing space, such as if it knows where a refrigerator is located in a house.

In some instances, the user of the sending device need not open their own shared space to share with another space. In some embodiments, the user of a device may click on content on the device and send it directly to a shared surface of a user of a receiving device. For example, a user of a device may click on a photo on the user's phone and select an option to share the photo with the shared surface of the user of the receiving device. In such an instance, the next time the user of the receiving device sees his shared surface (e.g., his desk), he would see the shared photo.

An object to be shared may be an ambient object. For example, a user of one artificial-reality device that is connected to an operating system may execute instructions for its device to send a message to another device. The receiving device may, for example, display dandelions to the user of the receiving device as a way to notify the receiving user that a message is available to be opened and read. Additionally or in the alternative, the receiving device may be programmed to display images of incoming messages coming out of or circling around a real-world object, such as a coffee cup. Similarly, a virtual object may be sent from a sending device to a receiving device as an ambient visual, such as sending an image of fairies flying in a fireplace.

The disclosed method provides for a social experience and exchange. In an embodiment, a virtual object, or a piece of an object, is made shareable. A user of an artificial reality device defines a space where virtual objects may be sent and received among users of other artificial-reality devices, which space may be anchored to a physical object in some way, though it may be arbitrarily defined. The group of connected users may be friends, family, coworkers, or any other defined group of individuals connected through the same operating system, such as a subset of any of the aforementioned groups. In some embodiments, users of the other devices may have previously defined a space for sharing and receiving with the user of a sending device. Additionally or in the alternative, the users of the other devices may define a space or accept a recommendation from their respective devices in response to a notification from the sending device that there is content or a virtual object to be shared. In some embodiments, the sending device may receive a label for the defined space as input and send the label to the other devices, through the server. In response, the other devices may use visual and saved location and map inputs to determine that a surface in the other user's locations matches the label. The other devices may present the determined surface as a recommendation. For example, a user of the sending device may define a front door of a refrigerator as a space to share virtual objects. The user may additionally add as input a label "refrigerator." This label may be sent along with instructions for the receiving device or devices to create a shared space or spaces in their location. In response, the receiving device or devices may use one or more of live input, shared data, and saved data used to determine what and where an item is, to further determine that the user of the receiving device has reached a refrigerator in their own location and recommend to the user to make the refrigerator a shared space.

In some embodiments, a shared space may grow organically out of the actions of a user. Instead of an artificial-reality device asking a user to define the shared space, it may automatically assume that a region in space is being used as a shared space based on the actions of the user. For example, if the user keeps putting virtual content on the right half of his table, his artificial-reality device might treat that half of the table as the user's shared space. After the system has made this determination, it may ask the user to confirm that this is meant to be a shared space. Alternatively, the device may simply continue to assume that this is a shared space unless instructed otherwise. In this way, the method is intuitive.

In an embodiment, a shared space is defined using a collection of virtual objects associated with a physical space. The objects in the space may be shared with other users when the other users are co-located or physically arrive at the defined space later or when remote devices have shared spaces which are inter-connected or linked. In the instance of users being co-located, the same shared space is displayed to all users who can see the space. In the instances of remote users, while the virtual objects may be the same, the exact way they are displayed may vary based on display instructions or varying dimensions and/or physical barriers within the shared space. In some embodiments, the virtual object may disappear from the shared space of the sending device after it has been sent to the receiving device. The users of one or more receiving devices may receive a notification stating that content has been shared by the user of the sending device. This may be done within the operating system itself, thus not requiring either the sending or the receiving user to open specific applications to share or see the content. The operating system may support sharing of all applications on a device. It may encapsulate third-party objects from any application into an operating system container known as an augment. Once something is in the container, the operating system can manipulate it, including sharing, without limits needing to consider the details of what is found in the container. One advantage of defining the space using virtual objects (or content items) is that the collection of virtual objects may naturally adjust to fit the receiving user's devices space, which may be of a different dimension than the space defined by the user of the sending device or the sending device itself. This adjustment may also be possible when the shared space is defined in any other way by sending instructions for rendering that are not limited by the boundaries of the sender-side shared space.

This method allows for asynchronous sharing of one shared space. In some embodiments, an engine inside an operating system contains an algorithm that constantly searches an area for virtual items to display to one or more users of artificial-reality devices. If a tracking mechanism within each device, which tracking mechanism is set to be connected to the operating system, determines that a device is within the vicinity of a space that has been created to be shared by a previous user of a different artificial-reality device, the operating system may automatically send a notification to the user that they are approaching a shared space. This notification may be, for example, a sound, a subtle visual, a message, an image of virtual objects within the shared space, or any other means of drawing the user's attention to the shared space. The device of the approaching user may be set to automatically display virtual objects contained in the shared space according to settings regarding, for example, specific locations or relationship to creators of the shared space. The settings may relate to specific individuals, types of objects, or previous interactions with a particular shared space.

In an embodiment, the nature of the creation of a shared space and of methods of notification may be set by both the user creating a shared space and virtual objects associated with the shared space and the user receiving access to the shared space and virtual objects associated with the shared space. Unlike in a traditional artificial reality game, the environment is not constrained. The users, both creating and receiving, have considerable control of shared spaces that they create.

The individualized nature with which users may view virtual objects in a shared space is aided by the way in which the artificial-reality devices share data. In some embodiments, a sending device generates instructions, in response to commands of a user, for sharing one or more virtual objects with one or more other devices. The instructions are sent to a server hosting the operating system which sends the instructions to the one or more other devices. The instructions are then executed by the one or more other devices. The one or more virtual objects may be static or animated. If a shared space created on the sending device is the same dimension or smaller than the one or more other devices, the one or more virtual objects may be presented in symmetrical locations. If the shared spaces are of different dimensions, the one or more other devices, or receiving devices, may execute the instructions, where the instructions may provide directions for how to place the virtual objects, static or animated, on a new space. This new space, or receiver-side shared space, may simply be a different size than the sender-side shared space, or it may contain virtual or physical objects which act as obstacles for the one or more shared virtual objects. Thus, this sending of instructions allows for the precise layout of the one or more virtual objects to be different on the receiving device or devices than on the sending device. Additionally or in the alternative, the one or more virtual objects may represent animation instructions. The animation instructions may be programmed to cause a visual to interact with objects and/or obstacles within the receiving space.

The process is similar when, as in some embodiments, the artificial-reality devices are co-located. A sending artificial-reality device executes instructions, in response to a user input, to designate a defined physical space as a shared space. For example, the defined physical space may be a refrigerator. The sending device may then send instructions to make the shared space visible to other artificial-reality devices, now receiving devices. The virtual objects may be shared via this single shared space, such that the sending and receiving of the virtual objects is synchronous or nearly synchronous. Sending and receiving devices may be connected through a server. The sending and receiving devices may both send and receive virtual objects such that they can share objects with each other, which may be particularly beneficial if, for example, two users are in the same room desiring to play a virtual game. There may be multiple devices involved in the sharing and receiving of objects in the single shared space. In some embodiments, one device may define an area, such as a refrigerator door or a table top, as a shared space. The user of the device may determine, at that time or through prior settings, which other devices will be able to view and/or share objects on the shared space. Other devices in the vicinity may be notified that the area has been designated as a shared space. The devices may alert their users, through various means, audio, visual, a combination, or otherwise, that a shared space is available to be displayed by the devices. The users may select an option to display the shared space or decline to have the shared space displayed on their devices. If the users decline, the shared space will not be made visible to them. If the users accept, the device associated with the user will display the objects included on the shared space. A user who wishes to share one or more virtual objects on the shared space may drag an object from outside to inside the shared space or select an object within the shared space to become visible. When an object is placed in the shared space, the device of the user who placed the item may send instructions to the server to share the object. The server may then send instructions to each device that has selected the option to have the objects in the shared space be displayed. The sharing may be instantaneous or have a slight delay for purposes of security or due to natural latency.

In an embodiment, virtual objects are shared via a single shared space such that the sending and receiving of the virtual objects is asynchronous. A user of a device may select an area to be the single shared space. Instructions may be sent from the device to a server to allow other devices to display objects placed in the single shared space at a given time or to continue sharing for a specified amount of time. Instructions may also be sent to the server to allow other devices to display objects in the single shared space. The server may register when another device enters the vicinity of the shared space through the use of maps and sensors. When the server determines that the given time has arrived when the one or more objects in the shared space are meant to be displayed, the server may send rendering instructions to any device in the vicinity of the shared space. The devices in the vicinity of the shared space may display a notification to the user. This notification may be received directly from the first device or through the server. The devices may ask the user whether or not the user wants to see the objects in the shared space. If the user accepts, instructions may be sent back to the server to send rendering instructions directly to the device. The device may then render images of the objects within the shared space. Similarly, a virtual object may be made available for viewing immediately but receiving devices may not be in the vicinity when the virtual object is shared. In this instance, the server may constantly search for authorized devise and send a notification when one arrives within a predetermined distance of the shared space.

One of the most social implementations of this method occurs when, in an embodiment, virtual objects are shared between two or more devices via different shared spaces such that the sending and receiving of the virtual objects is synchronous or nearly synchronous. It may be advantageous to share a particular space with another user who is in a different location. Such may be the case where, for example, a person wishes to share all the contents of the person's desk or refrigerator. In some embodiments, a user may label the surface by type, such as refrigerator, wall, or desk. The devices of other users who are receiving objects from the user of the sending device may determine a suitable surface to display the objects according to the label. For example, the receiving device may locate a refrigerator if the sending device indicates that the initial shared surface was a refrigerator. Alternatively, the receiving device may determine that a chess board being sent will best be located on a table of a certain height according to known measurements of the user of the receiving device or common characteristics from population data. This has the advantage of closer dimensions or similarity of experience between sender and receiver. It may also create a more natural sharing experience. The sending device may send instructions to a server to send rendering instructions to one or more selected other devices. The server may send a notification to the selected other devices that the first device is trying to share a space, or the objects contained within the space. The users of the other devices may select an option to decline or to accept the shared space.

In an embodiment, virtual objects are shared between two or more devices via different shared spaces such that the sending and receiving of the virtual objects is asynchronous. A device may receive input from a user indicating that an area should be designated as a shared space. In some embodiments, the device may present the area to the user as a recommendation for the shared space. The device may select the area to be presented based on a variety of sensor inputs and/or object mapping. The user of the sending device may define a time when the objects should be sent, or when, for example, it is sent to a specific shared space, instructions may be sent to the server to notify the receiving device when it arrives within a predetermined proximity of the space. It may even send instructions to notify the user of the receiving device that there is a virtual object deposited in the shared space that will be visible when the user arrives at the shared space. For example, a virtual object may specifically be sent to the desk of another, which desk has previously been set as a shared space. The receiver may be notified that there is, for example, a virtual picture waiting on her desk when she returns to her desk.

In some embodiments, virtual objects can be shared between artificial-reality devices without either device needing to download and/or open any applications. The virtual objects may be transferred natively, directly on an operating system. The virtual objects may be socially shareable. Users of both sending and receiving devices, which devices may be both sending and receiving devices at different times or the same time, may adjust privacy settings to determine when virtual objects are to be shared and with whom. The operating system level platform may allow third parties to plug in their content. The operating system may further manage how the sharing mechanism works. One advantage of this is that it removes the necessity for much of the logic that is normally required from an application and/or developer to share content. Many features do not need to be separately added.

In some embodiments, the operating system uses real world localization to determine that a physical object or space is equivalent to a physical object or space that has previously been labeled or used. The system may recognize where a device is located in the real world, given the proper permissions, so that when a virtual object is attached to a real-world object, the system stores the physical location in a map so that, from a user perspective, the virtual object appears to be attached to the real-world item. Until the physical object is moved, the virtual object will remain in that space when the user returns to it.

FIG. 8 illustrates an example method 800 for sharing of virtual objects in a single shared space where the users are co-located. The method may begin at step 810, where a sending device 101 creates a shared space by defining an area for the shared space (e.g., a point, a 2D surface, or a 3D volume located in the user's environment). The shared space may be defined in a variety of ways. For example, the sending device 101 may recommend the area based on sensory inputs, a user of the device 101 may define arbitrary borders using hand or other motions, or a recommendation may be made using a combination of sensory and direct user input. The shared space may be anchored to one or more physical object in the user's environment. For example, the shared space may be anchored to a refrigerator door, a wall, a table, etc. The shared space may be persisted by the sending device 101 or a server 102 to which the sending device 101 is connected. For example, the sending device 101 and/or the server 102 may store the dimensions of the shared space (e.g., orientation, size, and/or shape), feature descriptors of the one or more physical objects, and the spatial-relationship definition between the shared space and one or more physical objects to which it is anchored (e.g., position and/or orientation relative to one or more physical objects, like a refrigerator door). Such persisted information may be sent to (via the server 102 or direct peer-to-peer wireless connection) and used by any other artificial-reality device to recreate the shared space locally.

At step 820, the sending device 101, or its user through the device, may place virtual objects in the shared space. For example, an operating system executing on the device 101 may encapsulate content from any application running on the device 101 in a virtual object container. In doing so, the operating system may orchestrate all such encapsulated content from different applications and provide the user with a unified sharing experience. A virtual object may be rendered to represent the encapsulated content and shown to the user as if it is an object that exists in the user's 3D environment. The sending device 101 may use sensors (e.g., camera, microphone, depth sensor, etc.) to detect inputs from the user to determine whether the user is interacting with the virtual object. For example, the sending device 101 may use hand-tracking technology to determine where the user's hands are in the 3D environment to determine whether the hands are interacting with the virtual object, which is also positioned in 3D. Through this mechanism, the sending device 101 may detect when the user is holding onto the virtual object and moving it into the sending user's shared space. This may signal to the sending device 101 that the user wishes to share the virtual object with other users.

At step 830, the sending device 101 may send a command to share the shared space and its contents to a server 102. The command may include instructions on when to share the virtual objects in the shared space, which devices will be granted permission to see the virtual objects in the shared space, the content being shared, instructions for the rendering of the virtual objects themselves, and/or features associated with the shared space (e.g., dimensions, spatial-relationship definitions, and descriptors of physical objects to which the shared space is anchored). In particular embodiments, the server 102 may maintain a 3D map of the environment and use the features associated with the shared space to anchor the shared space in the 3D map. This allows the server 102 to enable other devices within the vicinity to also see the shared space. In addition, the command sent to the server 102 may be to share the shared space with a particular device or user associated with the particular device or to share with others that fit within a particular parameter. The particular parameter that is set may relate to a relationship to the user of the sending device (e.g., the relationship may be based on a social graph accessible to the server 102). Additionally or alternatively, the shared space may be made public, such that the space may be shared with any device within a particular proximity of the shared space.

At step 840, the server 102 identifies virtual reality devices in an around the shared space that meet pre-determined parameters for location and authorization. In some embodiments, the receiving device may be one of a plurality of receiving devices in the area, and the server may communicate with all of the plurality of receiving devices. Alternatively, there may be no devices that meet the parameters at a given time, in which case the server 102 may continue to search for authorized devices in the location of the shared space using any of a combination of sensors of devices, location data, and maps. The server 102 may continue to search even if there are authorized devices in the area to find more devices that meet the parameters. In some embodiments, the user of the sending device 101 may purposely set a delay for virtual objects to appear at a later time. Alternatively, the user may set a time limit for how long the virtual objects which are currently presented will remain visible to authorized devices. The server 102 may determine whether another device (e.g., receiving device 103) is at or near the shared space in a variety of ways. For example, the server 102 may maintain a 3D map of the physical environment. A device may periodically send its localization position to the server so that the server knows where the device is within the 3D map. For example, the device may inform the server 102 of its spatial-relationship definition with the descriptors of one or more physical objects detected by the device's sensors. The server 102 may match the descriptors with those in the 3D map and use the spatial-relationship definition to localize the user within the 3D map. Alternatively, the localization process may occur on the device. For example, upon entering a geographic region, it may request a portion of the 3D map from the server (e.g., the device may query for a portion of the 3D map based on GPS location, WiFi positioning, etc.). Thereafter, the device may compare the descriptors of physical objects detected by the device's sensors to the descriptors in the 3D map to estimate the location of the device within the 3D map. Such location information may be sent to the server 102 so that the server would know where the device is within the 3D map. In particular embodiments, the server may use the location of the device to determine whether the stored shared space is sufficiently close to the device (e.g., within a threshold distance) or visible to the device. The proximity between the device and the shared space may be a parameter that the server 102 checks for when determining whether to send to the device the shared space and/or the virtual objects shared through the shared space. At step 850, the server 102 sends a notification to the receiving devices 103 in response to determining that the parameters are satisfied (the parameters may also include determining that the receiving device is authorized to see the shared virtual object and/or access to the shared space itself).

The receiving device 103 may, at step 860, receive the notification from the server 102. In particular embodiments, at step 865 a user of the receiving device 103 is given an option to accept or reject having the shared space displayed by the receiving device 103. The option to accept or reject might not be showed if the user had previously provided a selection. If option is rejected, the objects within the shared space are not displayed by the receiving device 103. In some embodiments, if the user rejects the shared space, a virtual representation representing the boundaries of the shared space might not be available to the receiving device 103 either. If the option is accepted, the receiving device 103 identifies the shared space using a combination of sensors and maps along with the instructions from the server. Specifically, at step 870, the receiving device 103 accesses descriptors of one or more physical objects and a spatial-relationship definition between the physical object and the shared space from the server 102. The physical object acts as an anchor for the shared space. At step 872, the receiving device 103 uses its own sensors and potentially 3D maps of physical objects within the environment to detect the descriptors of the physical object(s) to which the shared space is anchored. At step 874, the receiving device 103 determines a pose of the shared space based on the detected physical object and the spatial-relationship definition which defines the location and orientation of the shared space relative to the physical object. The receiving device 103 may also use the detected physical object to determine a view-point of the receiving device 103 relative to the physical objects and/or shared space and use the viewpoint for rendering.

At step 880, the receiving device 103 may receive display instructions from the server 102 (it may alternatively receive instructions directly from the sending device 101). The display instructions may include the virtual object or content that is shared by the sending device 101. For example, if the shared virtual object is a photo or a note, the display instructions will include the corresponding data to allow the photo or note to be rendered on the receiving device 103. The display instructions may also indicate the size, location, and/or orientation of the shared object relative to the shared space. Such information allows the receiving device 103 to render the same layout of virtual objects within the shared space that other devices would render. Rendering the same layout for co-located users is especially important so that the users could see and interact with the same virtual objects. Although FIG. 8 shows the display instructions being received by the receiving device 103 at a particular step within the sequence of steps shown, it should be appreciated that the display instructions may be received at any time before the instructions are used for rendering. For example, the display instructions may be received along with the notification (step 860), after the user accepts the shared space (step 865), or before, after, or in parallel with any of the other steps shown.

At step 890, the receiving device 103 renders the virtual objects in the shared space based on the display instructions. The receiving device 103 may use the determined viewpoint of the user and the assets associated with the shared virtual objects, along with their spatial location and orientation, to render an image of the virtual scene for the user. The rendered image is then displayed on the display of the artificial-reality device. To the user, the rendered virtual object in the shared space would be anchored to the physical environment, thereby providing the user with an immersive experience where virtual objects behave like and co-exist with physical ones. In particular embodiments, content sharing between two devices may be limited to the virtual objects placed within the shared space (e.g., the users would be able to simultaneously see their respective private virtual objects along with objects within the shared space). If the user of the sending device 101 removes a virtual object that he/she had previously placed in the shared space, the receiving device 103 would no longer see it. In contrast, if the receiver device 103 moves a virtual object shared by the sending device 101 outside of the shared space, the virtual object may remain in the shared space for both devices to see, but a local duplicate may be created on the receiver device 103. This way, the user of the sending device 101 would continue to be able to see the virtual object it shared and have control over it.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for synchronous sharing of virtual objects in a single shared space including the particular steps of the method of FIG. 8, this disclosure contemplates any suitable method for synchronous and asynchronous sharing of virtual objects in a single shared space including any suitable steps, or co-located sharing, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
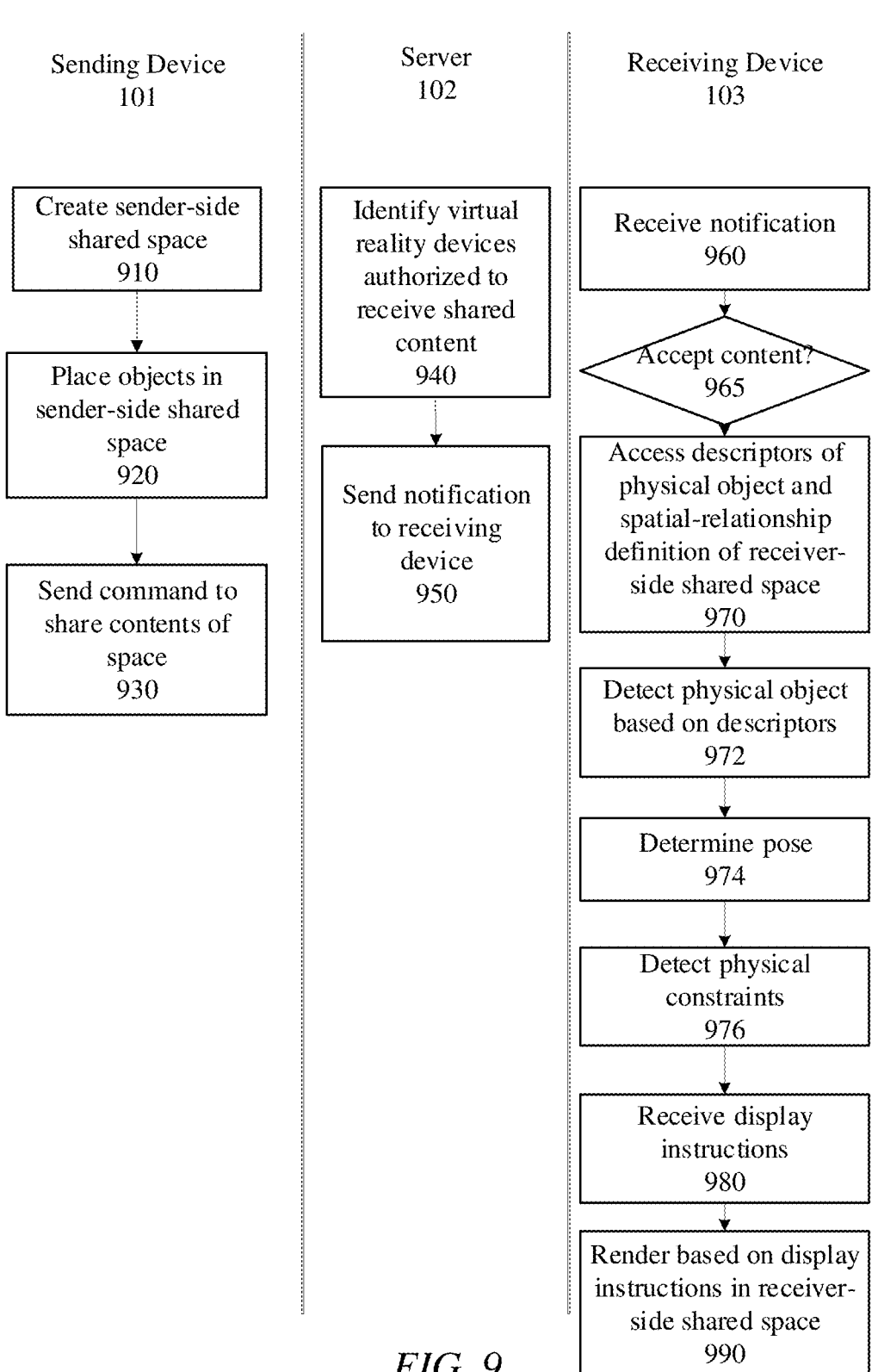
FIG. 9 illustrates an example method for remote sharing or sharing of virtual objects in connected separate shared spaces.

FIG. 9 illustrates an example method 900 for remote sharing or sharing of virtual objects in connected separate shared spaces between remote users. The method involves interactions between at least one sending device 101, a server 102, and at least one receiving device 103. The sending device 101 and the receiving device 103 may be an artificial-reality device, such as an artificial reality headset or an augmented reality system. The method may begin at step 910, where the sending device 101 creates a sender-side shared space. The sender-side shared space may be determined in a variety of ways, as described in more detail elsewhere herein. For example, the sending device 101 may use sensors to determine the boundaries of a physical object, which may be used to generate a recommended sender-side shared space for the user of the sending device 101. In some embodiments, a user of the sending device may select a physical object as an anchor for the sender-side shared space. At step 920, virtual objects may be placed in the sender-side shared space. In some embodiments, the shared space may be determined at least in part based on the placement of the virtual objects. At step 930, a command may be sent from the sending device 101 to the server 102 to share the contents of the shared space, as defined by the virtual objects inside the sender-side shared space. The command may be to share the contents of the shared space with a particular device or user associated with the particular device or to share with others that fit within a particular parameter. The particular parameter that is set may relate to a relationship to the user of the sending device (e.g., friends within a threshold social distance from the user within a social graph). At step 940, the server 102 identifies virtual reality devices that are authorized to receive the content placed in the sender-side shared space. The authorized virtual reality devices may be those within the group defined by the user of the sending device 101. In some instances, the contents of the shared space are set to be shared at a later time or when an authorized user comes into proximity of an area previously defined as a receiver-side shared space. Each authorized virtual reality device may be a receiving device 103. At step 950, the server 102 sends a notification to the receiving device 103 that a shared space is available for viewing.

At step 960, the receiving device 103 receives a notification from the server 102 that one or more virtual objects are shared with the receiving device 103 by the sending device 101. As described above, the one or more virtual objects may be shared based on being placed by a user of the sending device 101 inside the sender-side shared space anchored to a sender-side physical object. At step 965, the receiving device is optionally given the option of whether or not to accept the shared content for viewing. The receiving device 103 may do this by presenting an option to the user to accept or reject. Alternatively, the receiving device 103 may instead be set to accept shared content from a predetermined subset of other devices or from one or more particular individuals associated with other devices. If the user chooses to accept the space, the receiving device 103 may use its own sensors to determine a receiver-side shared space, which may or may not be related to the sender-side shared space. More particularly, this process involves, at Step 970, accessing descriptors of a physical object on the receiving side that can be used as an anchor to a receiver-side shared space and a definition of the spatial relationship between the physical object and the receiver-side shared space. For example, the descriptors of the physical object may be the features of a physical table, and a spatial-relationship definition may specify that the receiver-side shared space is a 2D surface that is layered on top of the physical table. At step 972, the receiving device 103 may detect a physical object based on the descriptors (e.g., the device 103 may detect the physical table by matching observed features of the physical table with the descriptors). At step 974, the receiving device may determine a pose of the receiver-side shared space based on the detected receiver-side physical object and the spatial-relationship definition (e.g., the device 103 may determine that the receiver-side shared space is to be placed on top of the detected physical table). At step 976, the receiving device 103 may, in some embodiments, detect physical constraints within the shared space (e.g., whether there are physical notebooks, monitors, cups, etc. placed on the table). In some embodiments, the receiving device 103 may, at step 980, receive display instructions for the one or more virtual objects shared by the sending device 101. FIG. 9 shows the display instructions being received after the physical constraints have been determined (i.e., step 976), but the instructions could be received at any other time as well (e.g. it could be received with the notification at step 960 or any time prior to step 990, when the content is rendered). At step 990, the receiving device 103 renders the virtual objects within the receiver-side shared space based on the display instructions. In some embodiments where the receiving device 103 considers the physical constraints within the receiver-side shared space, the virtual objects may be rendered based on the physical constraints as well. For example, if the rendering instructions is to render an animated vehicle that drives within the receiver-side shared space while avoiding physical objects, the receiving device 103 would take the physical constraints into account when determine the path of the vehicle in accordance with the received display instructions.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for synchronous sharing of virtual objects in connected separate shared spaces including the particular steps of the method of FIG. 9, this disclosure contemplates any suitable method for synchronous sharing of virtual objects in connected separate spaces including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
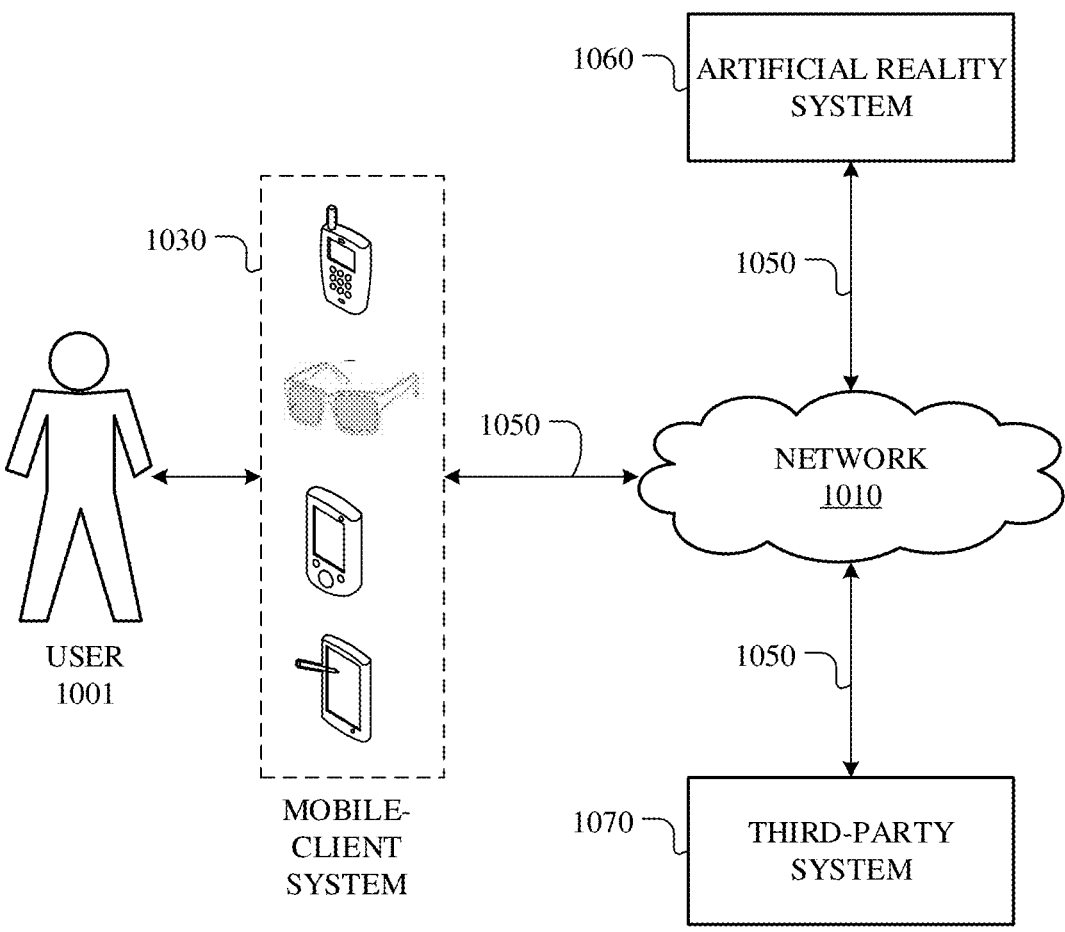
FIG. 10 illustrates an example network environment associated with an artificial reality system.

FIG. 10 illustrates an example network environment 1000 associated with an artificial reality system. Network environment 1000 includes a user 1001, a client system 1030 (e.g., AR/VR headset, mobile phone, etc.), an artificial reality system 1060, and a third-party system 1070 connected to each other by a network 1010. Although FIG. 10 illustrates a particular arrangement of user 1001, client system 1030, artificial reality system 1060, third-party system 1070, and network 1010, this disclosure contemplates any suitable arrangement of user 1001, client system 1030, artificial reality system 1060, third-party system 1070, and network 1010. As an example and not by way of limitation, two or more of client system 1030, artificial reality system 1060, and third-party system 1070 may be connected to each other directly, bypassing network 1010. As another example, two or more of client system 1030, artificial reality system 1060, and third-party system 1070 may be physically or logically co-located with each other in whole or in part. Moreover, although FIG. 10 illustrates a particular number of users 1001, client systems 1030, artificial reality systems 1060, third-party systems 1070, and networks 1010, this disclosure contemplates any suitable number of users 1001, client systems 1030, artificial reality systems 1060, third-party systems 1070, and networks 1010. As an example and not by way of limitation, network environment 1000 may include multiple users 1001, client system 1030, artificial reality systems 1060, third-party systems 1070, and networks 1010.

In particular embodiments, user 1001 may be an individual (human user), an entity (e.g., an enterprise, business, or third-party application), or a group (e.g., of individuals or entities) that interacts or communicates with or over artificial reality system 1060. In particular embodiments, artificial reality system 1060 may be a network-addressable computing system hosting an online social network. Artificial reality system 1060 may generate, store, receive, and send social-networking data, such as, for example, user-profile data, concept-profile data, social-graph information, or other suitable data related to the online social network. Artificial reality system 1060 may be accessed by the other components of network environment 1000 either directly or via network 1010. In particular embodiments, artificial reality system 1060 may include an authorization server (or other suitable component(s)) that allows users 1001 to opt in to or opt out of having their actions logged by artificial reality system 1060 or shared with other systems (e.g., third-party systems 1070), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of artificial reality system 30 through blocking, data hashing, anonymization, or other suitable techniques as appropriate. In particular embodiments, third-party system 1070 may be a network-addressable computing system that can host virtual content. Third-party system 1070 may generate, store, receive, and send virtual content, such as, for example, online videos, pictures, or webpages. Third-party system 1070 may be accessed by the other components of network environment 1000 either directly or via network 1010. In particular embodiments, one or more users 1001 may use one or more client systems 1030 to access, send data to, and receive data from artificial reality system 1060 or third-party system 1070. Client system 1030 may access artificial reality system 1060 or third-party system 1070 directly, via network 1010, or via a third-party system. As an example and not by way of limitation, client system 1030 may access third-party system 1070 via artificial reality system 1060. Client system 1030 may be any suitable computing device, such as, for example, a personal computer, a laptop computer, a cellular telephone, a smartphone, a tablet computer, or an augmented/artificial-reality device.

This disclosure contemplates any suitable network 1010. As an example and not by way of limitation, one or more portions of network 1010 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1010 may include one or more networks 1010.

Links 1050 may connect client system 1030, artificial reality system 1060, and third-party system 1070 to communication network 1010 or to each other. This disclosure contemplates any suitable links 1050. In particular embodiments, one or more links 1050 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1050 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1050, or a combination of two or more such links 1050. Links 1050 need not necessarily be the same throughout network environment 1000. One or more first links 1050 may differ in one or more respects from one or more second links 1050.

Figure 11:
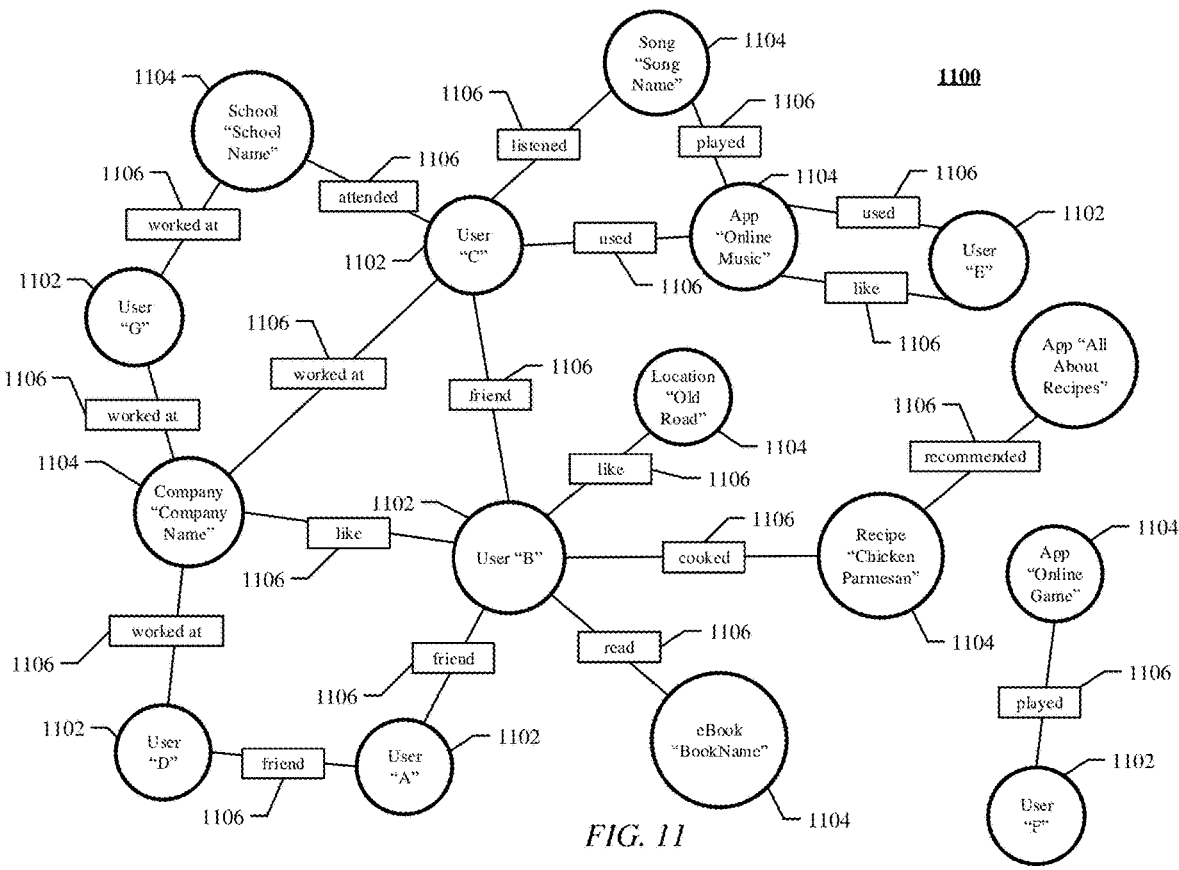
FIG. 11 illustrates an example social graph.

FIG. 11 illustrates example social graph 1100. In particular embodiments, social-networking system 1060 may store one or more social graphs 1100 in one or more data stores. In particular embodiments, social graph 1100 may include multiple nodes—which may include multiple user nodes 1102 or multiple concept nodes 1104—and multiple edges 1106 connecting the nodes. Each node may be associated with a unique entity (i.e., user or concept), each of which may have a unique identifier (ID), such as a unique number or username. Example social graph 1100 illustrated in FIG. 11 is shown, for didactic purposes, in a two-dimensional visual map representation. In particular embodiments, a social-networking system 1060, client system 1030, or third-party system 1070 may access social graph 1100 and related social-graph information for suitable applications. The nodes and edges of social graph 1100 may be stored as data objects, for example, in a data store (such as a social-graph database). Such a data store may include one or more searchable or queryable indexes of nodes or edges of social graph 1100.

In particular embodiments, a user node 1102 may correspond to a user of social-networking system 1060. As an example and not by way of limitation, a user may be an individual (human user), an entity (e.g., an enterprise, business, or third-party application), or a group (e.g., of individuals or entities) that interacts or communicates with or over social-networking system 1060. In particular embodiments, when a user registers for an account with social-networking system 1060, social-networking system 1060 may create a user node 1102 corresponding to the user and store the user node 1102 in one or more data stores. Users and user nodes 1102 described herein may, where appropriate, refer to registered users and user nodes 1102 associated with registered users. In addition or as an alternative, users and user nodes 1102 described herein may, where appropriate, refer to users that have not registered with social-networking system 1060. In particular embodiments, a user node 1102 may be associated with information provided by a user or information gathered by various systems, including social-networking system 1060. As an example and not by way of limitation, a user may provide his or her name, profile picture, contact information, birth date, sex, marital status, family status, employment, education background, preferences, interests, or other demographic information. In particular embodiments, a user node 1102 may be associated with one or more data objects corresponding to information associated with a user. In particular embodiments, a user node 1102 may correspond to one or more webpages.

In particular embodiments, a concept node 1104 may correspond to a concept. As an example and not by way of limitation, a concept may correspond to a place (such as, for example, a movie theater, restaurant, landmark, or city); a website (such as, for example, a website associated with social-network system 1060 or a third-party website associated with a web-application server); an entity (such as, for example, a person, business, group, sports team, or celebrity); a resource (such as, for example, an audio file, video file, digital photo, text file, structured document, or application) which may be located within social-networking system 1060 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 1104 may be associated with information of a concept provided by a user or information gathered by various systems, including social-networking system 1060. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1104 may be associated with one or more data objects corresponding to information associated with concept node 1104. In particular embodiments, a concept node 1104 may correspond to one or more webpages.

In particular embodiments, a node in social graph 1100 may represent or be represented by a webpage (which may be referred to as a "profile page"). Profile pages may be hosted by or accessible to social-networking system 1060. Profile pages may also be hosted on third-party websites associated with a third-party system 1070. As an example and not by way of limitation, a profile page corresponding to a particular external webpage may be the particular external webpage and the profile page may correspond to a particular concept node 1104. Profile pages may be viewable by all or a selected subset of other users. As an example and not by way of limitation, a user node 1102 may have a corresponding user-profile page in which the corresponding user may add content, make declarations, or otherwise express himself or herself. As another example and not by way of limitation, a concept node 1104 may have a corresponding concept-profile page in which one or more users may add content, make declarations, or express themselves, particularly in relation to the concept corresponding to concept node 1104.

In particular embodiments, a concept node 1104 may represent a third-party webpage or resource hosted by a third-party system 1070. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 1030 to send to social-networking system 1060 a message indicating the user's action. In response to the message, social-networking system 1060 may create an edge (e.g., a check-in-type edge) between a user node 1102 corresponding to the user and a concept node 1104 corresponding to the third-party webpage or resource and store edge 1106 in one or more data stores.

In particular embodiments, a pair of nodes in social graph 1100 may be connected to each other by one or more edges 1106. An edge 1106 connecting a pair of nodes may represent a relationship between the pair of nodes. In particular embodiments, an edge 1106 may include or represent one or more data objects or attributes corresponding to the relationship between a pair of nodes. As an example and not by way of limitation, a first user may indicate that a second user is a "friend" of the first user. In response to this indication, social-networking system 1060 may send a "friend request" to the second user. If the second user confirms the "friend request," social-networking system 1060 may create an edge 1106 connecting the first user's user node 1102 to the second user's user node 1102 in social graph 1100 and store edge 1106 as social-graph information in one or more of data stores 1064. In the example of FIG. 11, social graph 1100 includes an edge 1106 indicating a friend relation between user nodes 1102 of user "A" and user "B" and an edge indicating a friend relation between user nodes 1102 of user "C" and user "B." Although this disclosure describes or illustrates particular edges 1106 with particular attributes connecting particular user nodes 1102, this disclosure contemplates any suitable edges 1106 with any suitable attributes connecting user nodes 1102. As an example and not by way of limitation, an edge 1106 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1100 by one or more edges 1106. The degree of separation between two objects represented by two nodes, respectively, is a count of edges in a shortest path connecting the two nodes in the social graph 1100. As an example and not by way of limitation, in the social graph 1100, the user node 1102 of user "C" is connected to the user node 1102 of user "A" via multiple paths including, for example, a first path directly passing through the user node 1102 of user "B,"

a second path passing through the concept node 1104 of company "CompanyName" and the user node 1102 of user "D," and a third path passing through the user nodes 1102 and concept nodes 1104 representing school "SchoolName," user "G," company "CompanyName," and user "D." User "C" and user "A" have a degree of separation of two because the shortest path connecting their corresponding nodes (i.e., the first path) includes two edges 1106.

In particular embodiments, an edge 1106 between a user node 1102 and a concept node 1104 may represent a particular action or activity performed by a user associated with user node 1102 toward a concept associated with a concept node 1104. As an example and not by way of limitation, as illustrated in FIG. 11, a user may "like," "attended," "played," "listened," "cooked," "worked at," or "watched" a concept, each of which may correspond to an edge type or subtype. A concept-profile page corresponding to a concept node 1104 may include, for example, a selectable "check in" icon (such as, for example, a clickable "check in" icon) or a selectable "add to favorites" icon. Similarly, after a user clicks these icons, social-networking system 1060 may create a "favorite" edge or a "check in" edge in response to a user's action corresponding to a respective action. As another example and not by way of limitation, a user (user "C") may listen to a particular song ("SongName") using a particular application (a third-party online music application). In this case, social-networking system 1060 may create a "listened" edge 1106 and a "used" edge (as illustrated in FIG. 11) between user nodes 1102 corresponding to the user and concept nodes 1104 corresponding to the song and application to indicate that the user listened to the song and used the application. Moreover, social-networking system 1060 may create a "played" edge 1106 (as illustrated in FIG. 11) between concept nodes 1104 corresponding to the song and the application to indicate that the particular song was played by the particular application. In this case, "played" edge 1106 corresponds to an action performed by an external application (the third-party online music application) on an external audio file (the song "SongName"). Although this disclosure describes particular edges 1106 with particular attributes connecting user nodes 1102 and concept nodes 1104, this disclosure contemplates any suitable edges 1106 with any suitable attributes connecting user nodes 1102 and concept nodes 1104. Moreover, although this disclosure describes edges between a user node 1102 and a concept node 1104 representing a single relationship, this disclosure contemplates edges between a user node 1102 and a concept node 1104 representing one or more relationships. As an example and not by way of limitation, an edge 1106 may represent both that a user likes and has used at a particular concept. Alternatively, another edge 1106 may represent each type of relationship (or multiples of a single relationship) between a user node 1102 and a concept node 1104 (as illustrated in FIG. 11 between user node 1102 for user "E" and concept node 1104 for "online music application").

In particular embodiments, social-networking system 1060 may create an edge 1106 between a user node 1102 and a concept node 1104 in social graph 1100. As an example and not by way of limitation, a user viewing a concept-profile page (such as, for example, by using a web browser or a special-purpose application hosted by the user's client system 1030) may indicate that he or she likes the concept represented by the concept node 1104 by clicking or selecting a "Like" icon, which may cause the user's client system 1030 to send to social-networking system 1060 a message indicating the user's liking of the concept associated with the concept-profile page. In response to the message, social-networking system 1060 may create an edge 1106 between user node 1102 associated with the user and concept node 1104, as illustrated by "like" edge 1106 between the user and concept node 1104. In particular embodiments, social-networking system 1060 may store an edge 1106 in one or more data stores. In particular embodiments, an edge 1106 may be automatically formed by social-networking system 1060 in response to a particular user action. As an example and not by way of limitation, if a first user uploads a picture, watches a movie, or listens to a song, an edge 1106 may be formed between user node 1102 corresponding to the first user and concept nodes 1104 corresponding to those concepts. Although this disclosure describes forming particular edges 1106 in particular manners, this disclosure contemplates forming any suitable edges 1106 in any suitable manner.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1104 corresponding to a particular photo may have a privacy setting specifying that the photo may only be accessed by users tagged in the photo and their friends. In particular embodiments, privacy settings may allow users to opt in or opt out of having their actions logged by social-networking system 1060 or shared with other systems (e.g., third-party system 1070). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1070, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 1062 may be authorization/privacy servers for enforcing privacy settings. In response to a request from a user (or other entity) for a particular object stored in a data store 1064, social-networking system 1060 may send a request to the data store 1064 for the object. The request may identify the user associated with the request and may only be sent to the user (or a client system 1030 of the user) if the authorization server determines that the user is authorized to access the object based on the privacy settings associated with the object. If the requesting user is not authorized to access the object, the authorization server may prevent the requested object from being retrieved from the data store 1064, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 12:
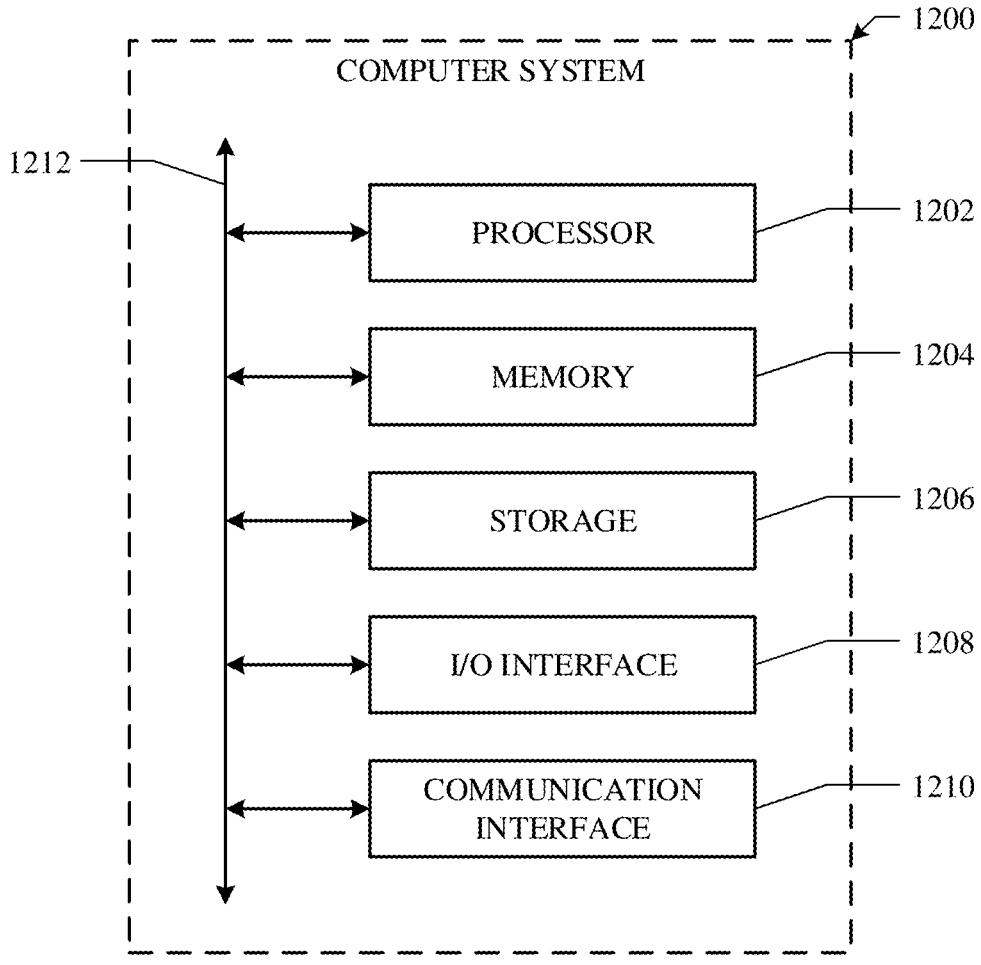
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a main-frame, a mesh of computer systems, a mobile telephone, a personal digital assistant (PDA), a server, a tablet computer system, an augmented/artificial-reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

We claim:

1. A method comprising:
   determining that one or more shared virtual objects are shared with a first artificial-reality device by a second artificial-reality device, wherein the one or more shared virtual objects are shared based on being placed inside a sender-side shared space;
   accessing descriptors of a receiver-side shared space configured to receive virtual objects;
   detecting, based on the descriptors, physical constraints corresponding to one or more physical objects within the receiver-side shared space;
   obtaining display instructions for the one or more shared virtual objects; and
   causing rendering, based on the display instructions and the physical constraints, of the one or more shared virtual objects within the receiver-side shared space so that the one or more shared virtual objects avoid spatially overlapping with the one or more physical objects in the receiver-side shared space.

2. The method of claim 1, further comprising:
   accessing mapped location data of an environment surrounding the first artificial-reality device;
   using the mapped location data to generate a recommendation for the receiver-side shared space; and
   storing, based on the recommendation for the receiver-side shared space, the descriptors of the receiver-side shared space.

3. The method of claim 2, wherein the mapped location data comprises information descriptors for A) the one or more physical objects in the receiver-side shared space and B) placement of the one or more shared virtual objects.

4. The method of claim 1, wherein the receiver-side shared space is a planar surface and the one or more shared virtual objects are rendered on top of the planar surface.

5. The method of claim 1, wherein the receiver-side shared space has different dimensions than the sender-side shared space.

6. The method of claim 1, wherein the second artificial-reality device sends the one or more shared virtual objects responsive to a first trigger and receipt of the one or more shared virtual objects by the first artificial-reality device is responsive to a second trigger that does not automatically occur based on the first trigger.

7. The method of claim 1, wherein:
   the second artificial-reality device is one of a plurality of artificial-reality devices that share virtual objects with the first artificial-reality device; and
   the receiver-side shared space is configured to display the virtual objects shared by the plurality of artificial-reality devices.

8. The method of claim 1, wherein the sender-side shared space is configured to automatically transmit, to the first artificial-reality device, virtual objects placed within the sender-side shared space.

9. The method of claim 1, wherein:
   a second virtual object is rendered encapsulating content from an application running on the first artificial-reality device;
   the first artificial-reality device is configured to detect, based on input tracking data, that a user of the first artificial-reality device moved the second virtual object into the receiver-side shared space; and
   the first artificial-reality device is configured to share, responsive to the detecting that the user of the first artificial-reality device moved the second virtual object into the receiver-side shared space, the second virtual object with the second artificial-reality device, which causes the second artificial-reality device to render the second virtual object within the sender-side shared space.

10. The method of claim 1, wherein the first artificial-reality device is configured to animate, after rendering the one or more shared virtual objects within the receiver-side shared space, the one or more shared virtual objects to have the one or more shared virtual objects move out of the receiver-side shared space and into an environment surrounding the receiver-side shared space.

11. The method of claim 1, wherein a placement of the one or more shared virtual objects relative to the sender-side shared space differs from a placement of the one or more shared virtual objects relative to the receiver-side shared space.

12. A non-transitory, computer-readable storage medium storing instructions that, when executed by a computing system, cause the computing system to perform a process comprising:
   determining that one or more shared virtual objects are shared with a first artificial-reality device by a second artificial-reality device, wherein the one or more shared virtual objects are shared based on being placed inside a sender-side shared space;
   accessing descriptors of a receiver-side shared space configured to receive virtual objects;

detecting, based on the descriptors, physical constraints corresponding to one or more physical objects within the receiver-side shared space;

obtaining display instructions for the one or more shared virtual objects; and causing rendering, based on the display instructions and the physical constraints, of the one or more shared virtual objects within the receiver-side shared space so that the one or more shared virtual objects avoid spatially overlapping with the one or more physical objects in the receiver-side shared space.

13. The non-transitory, computer-readable storage medium of claim 12, wherein a placement of the one or more shared virtual objects relative to the sender-side shared space differs from a placement of the one or more shared virtual objects relative to the receiver-side shared space.

14. The non-transitory, computer-readable storage medium of claim 12, wherein the receiver-side shared space is a planar surface and the one or more shared virtual objects are rendered on top of the planar surface.

15. The non-transitory, computer-readable storage medium of claim 12, wherein the receiver-side shared space has different dimensions than the sender-side shared space.

16. The non-transitory, computer-readable storage medium of claim 12, wherein the second artificial-reality device sends the one or more shared virtual objects responsive to a first trigger and receipt of the one or more shared virtual objects by the first artificial-reality device is responsive to a second trigger that does not automatically occur based on the first trigger.

17. The non-transitory, computer-readable storage medium of claim 12, wherein:

the second artificial-reality device is one of a plurality of artificial-reality devices that share virtual objects with the first artificial-reality device; and the receiver-side shared space is configured to display the virtual objects shared by the plurality of artificial-reality devices.

18. A computing system comprising:

one or more processors; and one or more memories storing instructions that, when executed by the one or more processors, cause the computing system to perform a process comprising:

determining that one or more shared virtual objects are shared with a first artificial-reality device by a second artificial-reality device, wherein the one or more shared virtual objects are shared based on being placed inside a sender-side shared space;

accessing descriptors of a receiver-side shared space configured to receive virtual objects;

detecting, based on the descriptors, physical constraints corresponding to one or more physical objects within the receiver-side shared space;

obtaining display instructions for the one or more shared virtual objects; and causing rendering, based on the display instructions and the physical constraints, of the one or more shared virtual objects within the receiver-side shared space so that the one or more shared virtual objects avoid spatially overlapping with the one or more physical objects in the receiver-side shared space.

19. The computing system of claim 18, wherein:

a second virtual object is rendered encapsulating content from an application running on the first artificial-reality device;

the first artificial-reality device is configured to detect, based on input tracking data, that a user of the first artificial-reality device moved the second virtual object into the receiver-side shared space; and the first artificial-reality device is configured to share, responsive to the detecting that the user of the first artificial-reality device moved the second virtual object into the receiver-side shared space, the second virtual object with the second artificial-reality device, which causes the second artificial-reality device to render the second virtual object within the sender-side shared space.

20. The computing system of claim 18, wherein the first artificial-reality device is configured to animate, after rendering the one or more shared virtual objects within the receiver-side shared space, the one or more shared virtual objects to have the one or more shared virtual objects move out of the receiver-side shared space and into an environment surrounding the receiver-side shared space.

* * * * *